US012217595B2

(12) United States Patent
Huang

(10) Patent No.: US 12,217,595 B2
(45) Date of Patent: Feb. 4, 2025

(54) NOTIFICATION DEVICE, WEARABLE DEVICE AND NOTIFICATION METHOD

(71) Applicant: Aurismart Technology Corporation, Taipei (TW)

(72) Inventor: Kuang-Chiu Huang, Taipei (TW)

(73) Assignee: AURISMART TECHNOLOGY CORPORATION, Taipei (TW)

( * ) Notice: Subject to any disclaimer, the term of this patent is extended or adjusted under 35 U.S.C. 154(b) by 206 days.

(21) Appl. No.: 18/046,239

(22) Filed: Oct. 13, 2022

(65) Prior Publication Data

US 2023/0058503 A1 Feb. 23, 2023

Related U.S. Application Data

(63) Continuation-in-part of application No. 17/331,726, filed on May 27, 2021, now abandoned.

(30) Foreign Application Priority Data

May 28, 2020 (TW) ................................ 109117898
May 28, 2020 (TW) ................................ 109206633

(51) Int. Cl.
*G08B 21/18* (2006.01)
*G08B 21/02* (2006.01)

(52) U.S. Cl.
CPC ........... *G08B 21/182* (2013.01); *G08B 21/02* (2013.01)

(58) Field of Classification Search
CPC .............................. G08B 21/182; G08B 21/02
USPC .......................................................... 340/665
See application file for complete search history.

(56) References Cited

U.S. PATENT DOCUMENTS 7,079,645 B1 * 7/2006 Short .................. H04M 1/6016 379/390.03
8,988,232 B1 * 3/2015 Sloo ...................... G01J 1/4204 340/602
9,749,733 B1 * 8/2017 Iyer ...................... H04R 1/1083
9,812,152 B2 * 11/2017 Christian ................ G10L 25/27
10,251,000 B2 * 4/2019 Hong ................... H04R 25/554
10,511,910 B2 12/2019 Ma et al.
10,638,223 B2 4/2020 Li
10,720,029 B1 * 7/2020 Mears .................... A61B 5/121
(Continued)

FOREIGN PATENT DOCUMENTS

CN 103049077 A 4/2013
CN 103813441 A 5/2014
(Continued)

*Primary Examiner* — Zhen Y Wu
(74) *Attorney, Agent, or Firm* — McClure, Qualey & Rodack, LLP

(57) ABSTRACT

A notification device includes a pressure sensor, a micro-controller and an output device. The pressure sensor is used to detect the environment to provide a plurality of sound signals in time domain. The microcontroller is used to calculate a dynamic threshold corresponding to a current time point based on the sound signals in time domain during a first time period prior the current time point. of the pressure signal in a period of time. When a magnitude of the sound signal in time domain at the current time point is greater than the dynamic threshold, the microcontroller sends a feedback signal to the output device. The output device is connected to the microcontroller. The output device is used to provide a feedback action according to the feedback signal.

18 Claims, 11 Drawing Sheets

600

(56) References Cited

U.S. PATENT DOCUMENTS

| | | | | |
|---|---|---|---|---|
| 10,789,041 | B2 * | 9/2020 | Kim | G06F 3/165 |
| 2004/0155770 | A1 * | 8/2004 | Nelson | G08B 1/08 340/531 |
| 2005/0282590 | A1 * | 12/2005 | Haparnas | H03G 3/32 455/569.1 |
| 2009/0190772 | A1 * | 7/2009 | Osada | H04R 3/04 381/73.1 |
| 2009/0303031 | A1 * | 12/2009 | Strohallen | G08B 25/14 340/407.1 |
| 2015/0221321 | A1 * | 8/2015 | Christian | G10L 25/48 700/94 |
| 2016/0323438 | A1 * | 11/2016 | Jehanno | G01H 3/14 |
| 2018/0007475 | A1 * | 1/2018 | Hong | H04R 25/30 |
| 2018/0018143 | A1 * | 1/2018 | Hong | H04R 1/1041 |
| 2018/0190084 | A1 * | 7/2018 | Mandlakazi | G08B 7/06 |
| 2019/0052964 | A1 * | 2/2019 | Ma | H04R 5/033 |
| 2020/0174517 | A1 * | 6/2020 | Martinez | G01S 19/01 |
| 2021/0016431 | A1 * | 1/2021 | Kim | B25J 19/026 |
| 2021/0361008 | A1 * | 11/2021 | Blevins | A42B 1/245 |
| 2021/0375111 | A1 | 12/2021 | Huang | |

FOREIGN PATENT DOCUMENTS

| | | | |
|---|---|---|---|
| CN | 106331954 | A | 1/2017 |
| CN | 107171685 | A | 9/2017 |
| CN | 107404682 | A | 11/2017 |
| CN | 108140284 | A | 6/2018 |
| CN | 216014810 | U | 3/2022 |
| TW | 200631549 | A | 9/2006 |
| TW | M462007 | U | 9/2013 |
| TW | M475386 | U | 4/2014 |
| TW | 201633264 | A | 9/2016 |
| TW | I603258 | B | 10/2017 |
| TW | 201843629 | A | 12/2018 |

* cited by examiner

NOTIFICATION DEVICE, WEARABLE DEVICE AND NOTIFICATION METHOD

CROSS-REFERENCE TO RELATED APPLICATIONS

This application is a continuation-in-part application of U.S. application Ser. No. 17/331,726, filed on May 27, 2021, which claims priority to Taiwan Application Serial Number 109117898, filed May 28, 2020 and Taiwan Application Serial Number 109206633, filed May 28, 2020, both of which are herein incorporated by reference in their entireties.

BACKGROUND

Field of Disclosure

The present disclosure relates to notification devices and wearable device with a notification device and notification methods.

Description of Related Art

In some workplaces, it is inconvenient to communicate directly through voice. For example, there are hearing impaired people in the workplace, or there is loud noise in the workplace. In these situations, workers remain isolated from the sound and it is not inconvenient to communication. If you use other communication aids in the market, it may affect working. In such regard, how to provide a portable and instant notification device is one of the problems that people in the related fields want to solve.

SUMMARY

An aspect of the present disclosure is related to a notification device

According to one or more embodiments of the present disclosure, a notification device includes a sound sensor, a microcontroller and an output device. The sound sensor is configured to detect a plurality of sound signals in time domain from an environment. The microcontroller is connected to the sound sensor to receive the sound signals in time domain. The microcontroller is configured to generate a plurality of dynamic statistics of the sound signals in time domain during a first time period prior to a current time point. The microcontroller is configured to generate a dynamic threshold corresponding to the current time point by composing the dynamic statistics. The microcontroller is configured to provide the sound signals in time domain during a second time period following the current time point and convert the when a magnitude of the sound signal in time domain at the current time point is greater than the dynamic threshold. The microcontroller is configured to transmit a feedback signal corresponding to the sound signals in time domain during the second time period following the current time point. The output device is connected to the microcontroller. The output device is configured to provide a feedback action according to the feedback signal.

In one or more embodiments of the present disclosure, the notification device further includes a server. The server is connected to the microcontroller through a network. The server is configured to receive the sound signals in time domain during the second time period following the current time point. The server is configured to transmit the feedback signal to the microcontroller according to a first sound type of the sound signals in time domain.

In some embodiments of the present disclosure, the server further includes a processor and a sound recognition module. The processor is configured to convert the sound signals in time domain during the second time period into a plurality of spectrograms. The sound recognition module is configured to recognize the spectrograms to obtain a plurality of probabilities of a plurality of sound types of the sound signals in time domain during the second time period, wherein the sound types include the first sound type.

In one or more embodiments of the present disclosure, the dynamic statistics includes an average value, a median value, a mode value, a maximum value, a minimum value, a standard deviation and a quartile deviation of the sound signals in time domain during the first time period.

In one or more embodiments of the present disclosure, the output device includes a light emitting device, a vibrator, a sound amplifier or a text icon display device.

An aspect of the present disclosure is related to a wearable device.

According to one embodiment of the present disclosure, a wearable device includes the mentioned notification device and a cloth. The pressure sensor, the microcontroller and the output device of the notification device are arranged on the cloth.

An aspect of the present disclosure is related to a notification method, which can be performed by the mentioned notification device.

According to one or more embodiments of the present disclosure, a notification method includes a number of operations. A plurality of sound signals in time domain is detected from environment. The sound signals in time domain during a first time period prior to a current time point are processed to obtain a plurality of dynamic statistics of the sound signals in time domain during the first time period. A dynamic threshold corresponding to the current time point is generated by the dynamic statistics. It is confirmed that whether a magnitude of the sound signals in time domain at the current time point is greater than the dynamic threshold. The sound signals in time domain during a second time period following the current time point are converted to a plurality of sound information in frequency domain when the magnitude of the sound signals in time domain at the current time point is greater than the dynamic threshold. The sound information in frequency domain are recognized to obtain a first sound type corresponding to the sound information. A feedback signal is transmitted to an output device based on the first sound type.

In one or more embodiments of the present disclosure, the dynamic statistics includes an average value, a median value, a mode value, a maximum value, a minimum value, a standard deviation and a quartile deviation of the sound signals in time domain during the first time period.

In one or more embodiments of the present disclosure, generating the dynamic threshold corresponding to the current time point by the dynamic statistics includes a number of operations. A plurality of candidate dynamic thresholds is generated, wherein each of the candidate dynamic thresholds is formed by the dynamic statistics and a plurality of weights corresponding to the dynamic statistics. The smallest one of the candidate dynamic thresholds is selected as the dynamic threshold.

In one or more embodiments of the present disclosure, the current time point changes over time, so that the first time period and the second time period change relative to the current time point.

In one or more embodiments of the present disclosure, the sound information in frequency domain are a plurality of spectrograms.

In one or more embodiments of the present disclosure, recognizing the sound information in frequency domain further includes a number of operations. A plurality of time intervals all within the second time period is generated. The sound signals in time domain during the time intervals are converted into the sound information In some embodiments, one or more of the time intervals are overlapped from each other.

In some embodiments, the sound information in frequency domain are a plurality of spectrograms. Recognizing the sound information in frequency domain further includes a number of operations. The spectrograms are recognized to obtain a plurality of probabilities corresponding to a plurality of sound types for each of the spectrograms, wherein the sound types comprise the first sound type.

In some embodiments, recognizing the sound information in frequency domain further includes a number of operations. A notification threshold corresponding to the first sound type is set. The feedback signal corresponding to the first sound type is provided when an accumulation of the probabilities for the first sound type during that second time period is greater than that notification threshold.

An aspect of the present disclosure is related to a notification method, which can be performed by the mentioned notification device.

According to one or more embodiments of the present disclosure, a notification method includes a number of operations. Sounds are detected from environment and a plurality of conditions corresponding to the sounds from the environment is provided to establish a sound recognition module in a server. A plurality of sound signals in time domain is detected from environment. The sound signals in time domain during a first time period prior to a current time point are processed to obtain a plurality of dynamic statistics of the sound signals in time domain during the first time period. A dynamic threshold corresponding to the current time point is generated by the dynamic statistics. It is confirmed whether a magnitude of the sound signals in time domain at the current time point is greater than the dynamic threshold. The sound signals in time domain during a second time period following the current time point are transmitted to the server. The sound signals in time domain during the second time period is recognized to obtain a first sound type of the sound signals in time domain during the second time period, wherein the first sound type corresponds to one of the condition. A feedback signal corresponding to the first sound type is provided. A feedback action is provided by an output device according to the feedback signal to notify an user wearing the output device In one or more embodiments of the present disclosure, the dynamic statistics includes an average value, a median value, a mode value, a maximum value, a minimum value, a standard deviation and a quartile deviation of the sound signals in time domain during the first time period.

In one or more embodiments of the present disclosure, generating the dynamic threshold corresponding to the current time point by the dynamic statistics further includes a number of operations. A plurality of candidate dynamic thresholds is generated, wherein each of the candidate dynamic thresholds is formed by the dynamic statistics and a plurality of weights corresponding to the dynamic statistics. The smallest one of the candidate dynamic thresholds is selected as the dynamic threshold.

In one or more embodiments of the present disclosure, the current time point changes over time, so that the first time period and the second time period change relative to the current time point.

In one or more embodiments of the present disclosure, recognizing the sound information in frequency domain by the sound recognition module further includes a number of operations. A plurality of time intervals all within the second time period is generated. The sound signals in time domain during the time intervals are converted into the sound information, wherein the sound information are a plurality of spectrograms. The spectrograms are recognized to obtain a plurality of probabilities corresponding to a plurality of sound types for each of the spectrograms, wherein the sound types comprise the first sound type. A notification threshold corresponding to the first sound type is set. The feedback signal corresponding to the first sound type is provided when an accumulation of the probabilities for the first sound type during that second time period is greater than that notification threshold.

In summary, the present disclosure provides a notification device, a wearable device using the notification device, and a corresponding notification method to notify the user in real time according to the environmental volume, so that the user can easily perceive changes in the environment.

it is to be understood that both the foregoing general description and the following detailed description are by examples, and are intended to provide further explanation of the invention as claimed.

BRIEF DESCRIPTION OF THE DRAWINGS

The advantages of the present disclosure are to be understood by the following exemplary embodiments and with reference to the attached drawings. The illustrations of the drawings are merely exemplary embodiments and are not to be considered as limiting the scope of the present disclosure.

DETAILED DESCRIPTION

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations. Also, the same labels may be regarded as the corresponding components in the different drawings unless otherwise indicated. The drawings are drawn to clearly illustrate the connection between the various components in the embodiments, and are not intended to depict the actual sizes of the components.

In addition, terms used in the specification and the claims generally have the usual meaning as each terms are used in the field, in the context of the disclosure and in the context of the particular content unless particularly specified. Some terms used to describe the disclosure are to be discussed below or elsewhere in the specification to provide additional guidance related to the description of the disclosure to specialists in the art.

The phrases "first," "second," etc., are solely used to separate the descriptions of elements or operations with the same technical terms, and are not intended to convey a meaning of order or to limit the disclosure.

Additionally, the phrases "comprising," "includes," "provided," and the like, are all open-ended terms, i.e., meaning including but not limited to.

Further, as used herein, "a" and "the" can generally refer to one or more unless the context particularly specifies otherwise. It will be further understood that the phrases "comprising," "includes," "provided," and the like used herein indicate the stated characterization, region, integer, step, operation, element and/or component, and does not exclude additional one or more other characterizations, regions, integers, steps, operations, elements, components and/or groups thereof.

Figure 1:
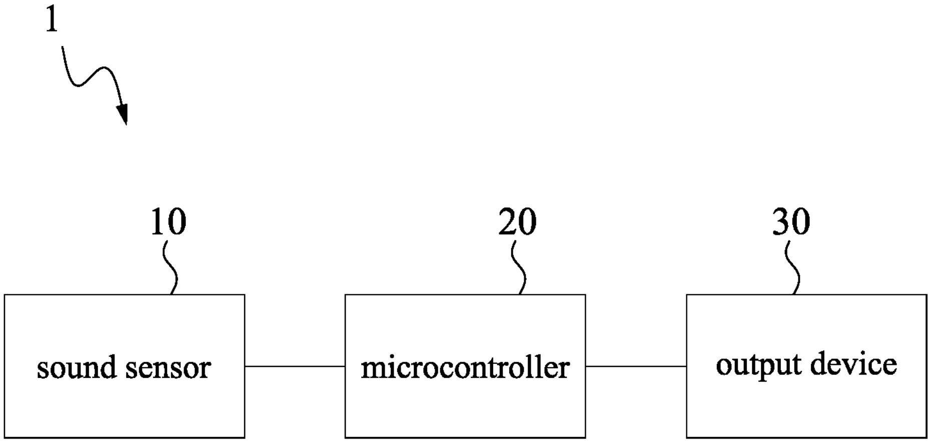
FIG. 1 illustrates a block diagram of a notification device according to an embodiment of the present disclosure.

Reference is made by FIG. 1. FIG. 1 illustrates a block diagram of a notification device 1 according to an embodiment of the present disclosure. As shown in FIG. 1, the notification device 1 includes a sound sensor 10, a microcontroller 20 and an output device 30. Through the notification device 1, the user can be notified in real time according to changes in the environment.

The sound sensor 10 is used to detect environment to receive sound signals in the environment. When the notification device 1 is configured in an environment such as a warehouse or a factory, the received sound signal is, for example, the sound of engineering equipment or the human voice of other workers, and the received sound signal is an analog signal. In some embodiments, the sound sensor 10 is, for example, a microphone sensing module (for example, condenser microphone), or may be a condenser microphone sensing module simply arranged in an array.

A microcontroller (microcontroller, or named as microcontroller unit, MCU for short) 20 is connected to the sound sensor 10. The microcontroller 120 has the advantages of small size, easy portability, and can be configured to implement simple arithmetic functions. The sound sensor 10 can transmit the sound signal to the microcontroller 20, and the sound signal from the sound sensor 10 is simply processed by the microcontroller 20. The microcontroller 20 can also integrate a function for judging the volume of the sound signal. Therefore, the microcontroller 20 can record a sound signal over a period of time and provide a feedback signal according to the volume change of the sound signal.

The output device 30 is connected to the microcontroller 20 to provide a feedback action based on the feedback signal. The output device 30 can include a light emitting device, a vibrator, a sound amplifier, or a text icon display device. The text icon device directly reminds the user more intuitively by displaying text or other icons. The text icon display device includes a small portable display.

Therefore, the notification device 1 can detect the environment through the sound sensor 10 to provide sound signals. The microcontroller 20 connected to the sound sensor 10 processes the dynamic average value of the sound signals over a period of time. The dynamic average value refers to the average volume of the sound signals in the previous period of time. Based on the dynamic average value, a dynamic threshold can be predetermined. If a volume of the current sound signal is greater than the dynamic threshold calculated by the dynamic average value of the previous period, it means that the environment has changed, there may be danger or there is a need for communication around, and the microcontroller 20 provides a feedback signal to the output device 30, so that the output device 30 provides a feedback action to notify the user.

In some embodiments, instead of the sound sensor 10, other types of pressure sensors can also be used as the notification device 1. A kind of pressure sensor is the sound sensor 10, which is used to sense and convert the sound pressure change in the sound transmission in the environment into sound signals and then calculate a dynamic average value to obtain a dynamic threshold. In some embodiments, other types of pressure sensors such as air pressure sensors can be used as the notification device 1. For example, the air pressure sensor can sense the dynamic average value of the air pressure during a period of time. Once the current air pressure value is greater than the dynamic average value calculated in the previous period, the microcontroller 20 can send a feedback signal to enable the output device 30 to provide a feedback action to immediately notify the user who uses the notification device 1.

Figure 2:
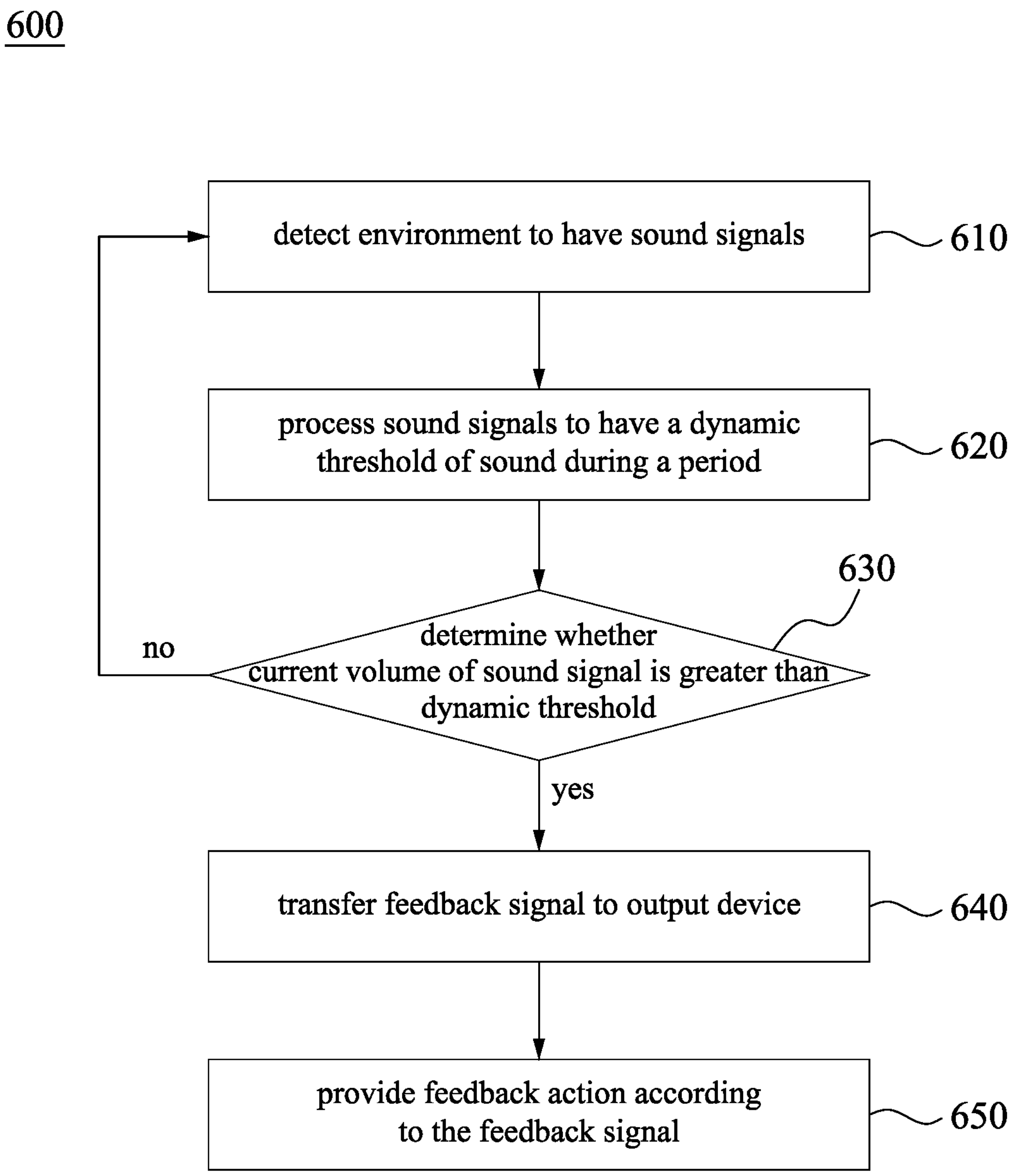
FIG. 2 illustrates a flowchart of a notification method according to an embodiment of the present disclosure.

Reference is made by FIG. 2 to further describe how to notify the user by the notification device. FIG. 2 illustrates a flowchart of a notification method 600 according to an embodiment of the present disclosure. The notification method 600 includes operation 610~650.

In operation 610, the sound sensor 10 of the notification device 1 can be used to detect environment around the user to obtain sound signals during a period of time.

In operation 620, the sound signals can be processed by the microcontroller 20 connected to the sound sensor 10 to obtain the dynamic threshold during a period of time. The microcontroller 20 can first calculate the dynamic average value of the volumes of the sound signals during a period of time according to the sound signals. For example, the sound sensor 10 can obtain a dynamic average value of the volumes during the period from 3 seconds ago to 1 second ago. After the notification device 1 is activated, the dynamic average value may change in times continuously.

According to the dynamic average value, the microcontroller 20 can define the dynamic threshold of the volumes of the sound signals in different times, so as to determine whether the volumes of the sound signals have a large change in a short time. In some embodiments, the dynamic threshold can be set as the dynamic average value. In some embodiments, it can be set that the dynamic threshold is different from the dynamic average value according to the magnitude of the dynamic average value. For example, if the dynamic average value of the volumes of the sound signal is less than a specific decibel (dB), the dynamic threshold is set to a value greater than the dynamic average value; and if the dynamic average value of the volumes of the sound signals is greater than the specific decibel, the set dynamic threshold is directly equal to the dynamic average value.

Through operation 620, the dynamic average value of the volumes of the received sound signal is set. In the process 630, it can be determined whether a volume of a current sound signal is greater the dynamic threshold according to the current volume of the sound signal. If yes, the operation 640 is entered, and a feedback signal is sent to the output device 30. If not, return to operation 610 and continue to detect the environment to provide sound signals.

For example, in a specific embodiment, the dynamic average volume of the volumes of the sound signals from 3 seconds ago to 1 second ago is calculated by the microcontroller 20 calculates and is a specific decibel value (e.g., 60 dBs), and the dynamic average value of the volumes of the sound signals is set as the dynamic threshold by the microcontroller 20 (operation 620). Then, once the current volume of the sound signal is greater than the dynamic threshold (for example, greater than 60 dBs), the situation corresponds to the determination of operation 630 as yes, the operation 640 is entered and the microcontroller 20 can provide a feedback signal to the output device 30 in real time.

Therefore, in the operation 650, the output device 30 can provide an appropriate feedback action based on the feedback signal from the microcontroller 20 to notify the user who uses the notification device 1. The notification method 600 can be implemented by a mobile device. For example, mobile devices such as smart phones have a microphone, a processor, and a vibrator configured to vibrate the phone. The installation of an application (APP) is performed on the smart phone for the notification, and it enables the microphone to act as the sound sensor 10, the processor of the mobile phone functions as the microcontroller 20, and the vibrator of the mobile phone acts as the output device 30 to provide notification vibration feedback action.

Figure 3:
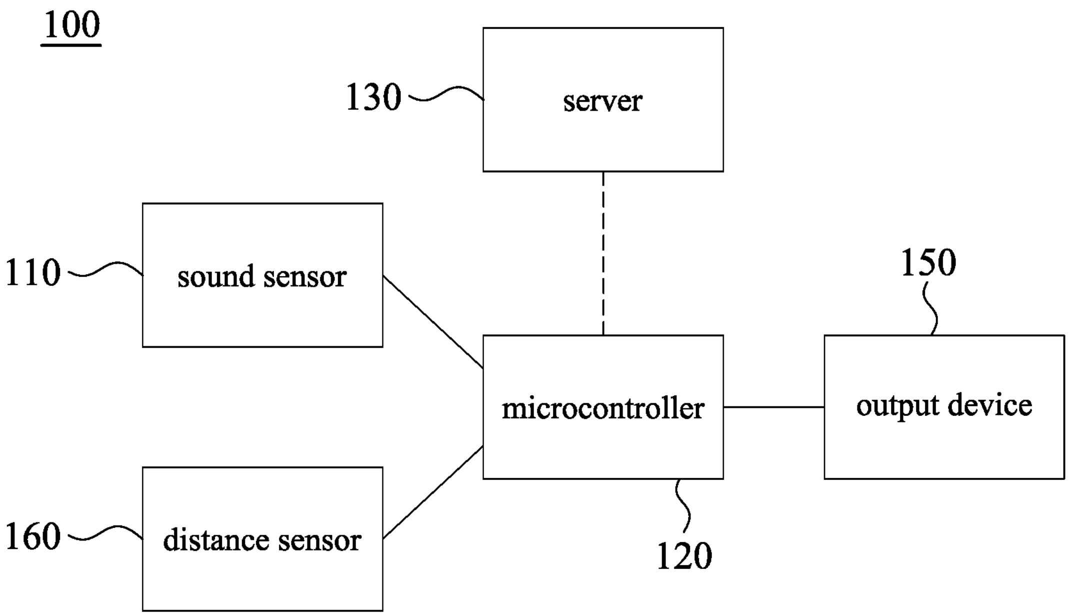
FIG. 3 illustrates a block diagram of a notification device according to an embodiment of the present disclosure.

Reference is made by FIG. 3. FIG. 3 illustrates a block diagram of a notification device 100 according to an embodiment of the present disclosure. The notification device 100 is built on the basis of the notification device 1 and can further provide intelligent notification and alert functions in addition to the function of the notification device 1. As shown in FIG. 3, the notification device 100 includes a sound sensor 110, a microcontroller 120, a server 130, an output device 150, and a distance sensor 160. In this embodiment, the sound sensor 110, the output device 150, and the distance sensor 160 are connected to the microcontroller 120, and the server 130 is located remotely, for example, connected to the microcontroller 120 by a network. The server 130 can be used for complex computation. Since the server 130 can be located remotely, when the notification device 100 is operated, only the sound sensor 110, the microcontroller 120, the output device 150, and the distance sensor 160 need to be carried. In some embodiments, the network is, for example, a wireless network shared by a mobile phone of the user. In some embodiments, the microcontroller 120 can be connected to the network through Bluetooth communication. In some embodiments, the network may be another type of wireless network (Wi-Fi), such as Zigbee. In some embodiments, the network may also be narrow band Internet of things (narrow band Internet of things, NBIoT) of a fourth-generation mobile communication technology (4G) or LTE-M technology. In some embodiments, the network may be provided by the fifth-generation mobile communication technology (5G) to achieve faster transmission rate and interaction.

The sound sensor 110 is similar to the sound sensor 10 in FIG. 1. The sound sensor 110 is used to detect the environment to receive sound signals in the environment. For example, when the notification device 100 is used in an environment such as a warehouse or a factory, the received sound signals are, for example, the sounds of engineering equipment or the human voice of other workers, which are analog signals. Specifically, in some embodiments, the sound sensor 110 is, for example, a microphone sensing module. The microphone sensing module is, for example, a condenser microphone. In some embodiments, the condenser microphone sensing modules can also be simply arranged in an array.

In order to facilitate analysis, the received analog sound signals can be processed to filter noises after the sound signals from the environment are received by the sound sensor 110. In some embodiments, other devices used for filtering noise can also be provided on the sound sensor 110.

The microcontroller 120 is similar to the microcontroller 20 in FIG. 1. The microcontroller 120 is connected to the sound sensor 110. The microcontroller 120 has the advantages of small size, easy portability, and can be used to implement simple arithmetic functions. Furthermore, the microcontroller 120 can be connected to a remote server 130 by a network. Through the connection with the microcontroller 120, the sound sensor 110 can transmit the sound signals to the microcontroller 120. In some embodiments, the network can be provided by, for example, a mobile phone.

Figure 4:
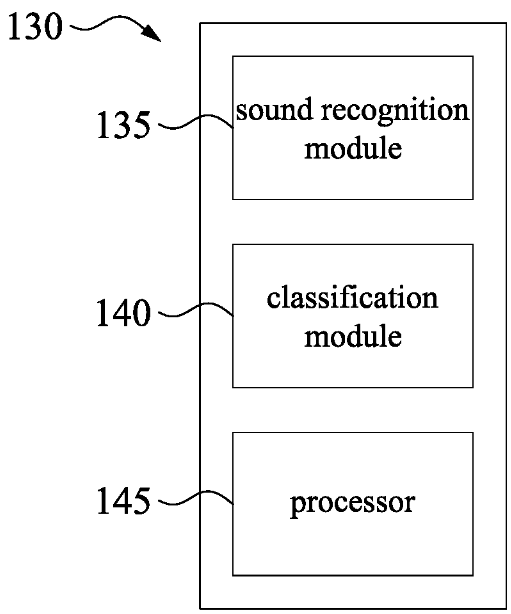
FIG. 4 illustrates a block diagram of a server according to an embodiment of the present disclosure.

The server 130 is located remotely and used to perform more complicated operations. Reference is made by FIGS. 3 and 4. FIG. 4 illustrates a block diagram of the server 130 according to an embodiment of the present disclosure. In this embodiment, the server 130 includes a sound recognition module 135, a classification module 140, and a processor 145. In some embodiments, the sound recognition module 135, the classification module 140, and the processor 145 are computer components in the server 130. In some embodiments, the sound recognition module 135, the classification module 140, and the processor 145 can be integrated into the same hardware.

The sound recognition module 135 is configured for recognizing sound signals. The classification module 140 is configured to classify types of the recognized sound signals. The processor 145 is configured to provide a feedback signal according to the types of the sound signals. For details, please refer to specific operation methods below. Through the remote transmission of the network, the microcontroller 120 can be used to receive the feedback signal from the server 130 remotely.

The output device 150 is connected to the microcontroller 120 to provide feedback actions according to the feedback signals. The output device 150 is similar to the output device 30 in FIG. 1 and includes a light emitting device, a vibrator, a sound amplifier, or a text icon display device. The text icon display device includes a small portable display. In order to cope with the inconvenient environment for communicating with voice, in some embodiments, the feedback action of the output device 150 does not include voice/sound feedback.

The distance sensor 160 is connected to the microcontroller 120 to detect the distance between the notification device 100 and an object. For example, the distance sensor 160 is, for example, an ultrasonic distance sensing device. In some embodiments, the distance sensor 160 uses infrared rays for distance sensing, or uses millimeter-wave radar or sub-millimeter-wave radar. Due to the used short wavelength, it can have a wider sensing range to detect objects in a great angular range.

Figure 5:
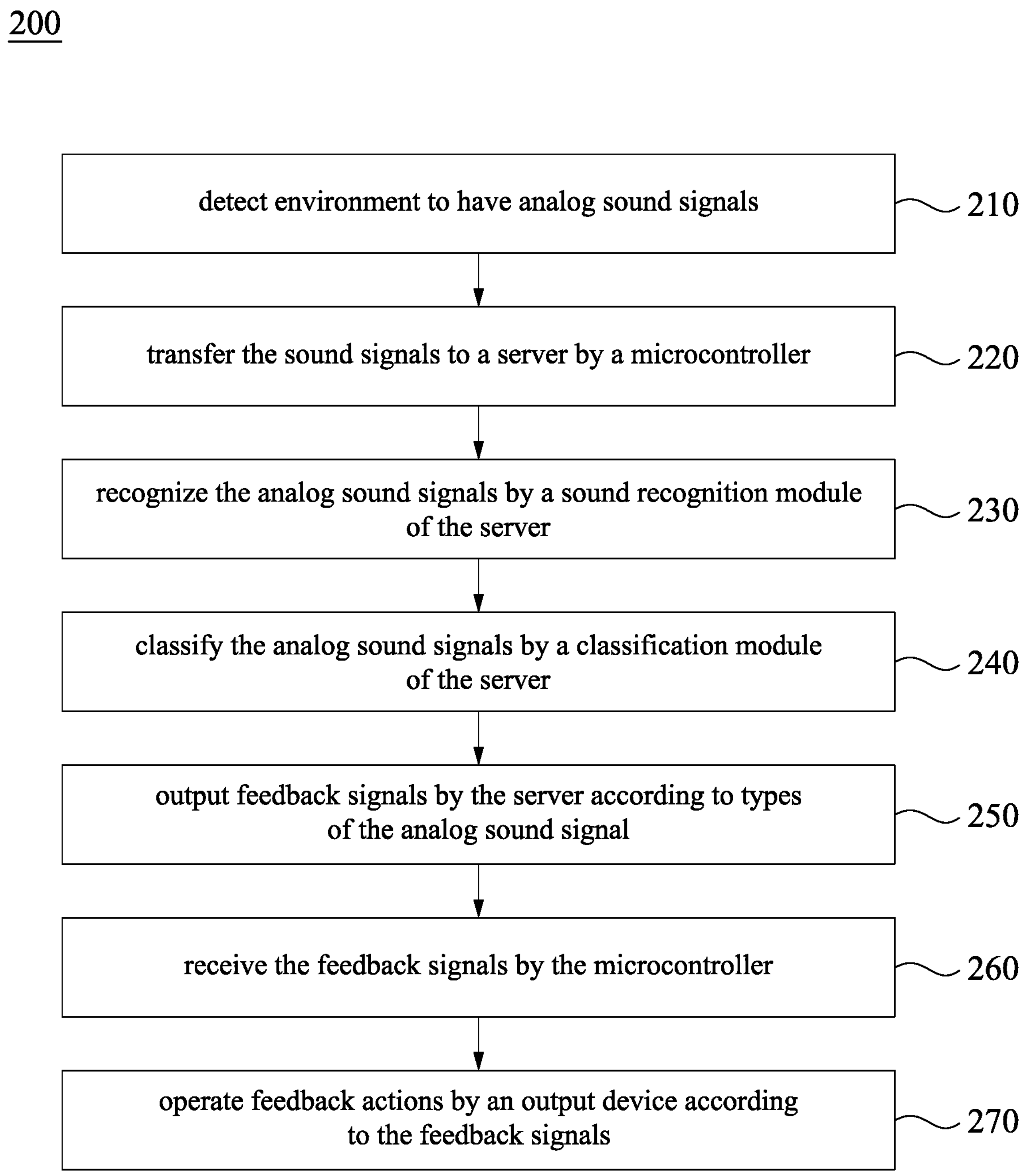
FIG. 5 illustrates a flowchart of a notification method provided by a notification device according to an embodiment of the present disclosure.

Reference is made by FIG. 5. FIG. 5 illustrates a flowchart of a notification method 200 provided by a notification device 100 according to an embodiment of the present disclosure.

In operation 210 of the notification method 200, the sound sensor 110 of the notification device 100 detects environment to obtain analog sound signals.

Following the operation 210, in the operation 220, the analog sound signals are transmitted by the microcontroller 120 to the server 130 through, for example, a network.

In operation 230, the analog sound signals are recognized by the sound recognition module 135 of the server 130. Through the recognition of the sound recognition module 135, the server 130 can obtain the sounds contained in the analog sound signal, such as the warning sound from a person, the specific content of the warning sound, and/or the sound of engineering equipment.

In operation 240, types of the analog sound signals can be classified through the classification module 140 of the server 130. In the operation 250, feedback signals are outputted by the server 130 according to the types of the sound signals. In other words, a type of the sound signal can correspond to a kind of feedback signal. A type of the sound signal is classified according to the response after the sound signal is received, and the type is used for warning of danger or call communication, for example.

In some embodiments, the sound signals in the working environment can be classified into plurality of types, and each of the types of the sound signals corresponds to a condition, and the condition corresponds to one of feedback actions. A number of the types of sound signals is finite and can be customized and introduced according to the conditions.

For example, in some implementations, there is only one type “dangerous” of the sound signals. The sound signal is received by the notification device 100 (operation 210) and uploaded to the server (operation 220), a recognition of the sound signal is completed (operation 230), and then it learns that the content of the sound signal is to inform the user that it is dangerous (e.g., the content of the sound signal can be a sound of working equipment or human voice), and the sound signal can be classified as “dangerous” by the notification device 100 at this time, so that a corresponding feedback signal is outputted by the server 130 to the output device 150 to notify the user of the notification device 100 that the user is at risk.

Specifically, in another practical example, there are six types of sound signals including dodging to the left if danger appears, dodging to the right if danger appears, vibrating, other types of danger, moving to the right, and reminding to be called by someone. For example, a sound signal is received by the notification device 100 (operation 210) and uploaded to the server (operation 220), the recognition of the sound signal is completed (operation 230), and then the content of the sound signal is to notify the user that the right side is dangerous and the user should dodge to the left. At this time, the sound signal is classified into the type “dodging to the left if danger appears” by the notification device 100 (operation 240). Subsequently, a feedback signal about dodging to the left is outputted by the server 130 (operation 250).

In some embodiments, the distance sensor 160 can also be used to provide information about the environment near around the user of the notification device 100, so that much accurate judgments can be provided by the server 130. For example, in some embodiments, a large-size work equipment moves from the rear right to the user of the notification device 100. At the same time, the sound signals of the large-size equipment sound are detected by the sound sensor 110 and an approach of an object from the rear right is detected by the distance sensor 160, so that the server 130 can identify and classify that the type of the sound signal is about dodging to the left according to the above information, thereby providing a feedback signal about dodging to the left.

Continued with operation 250, in the operation 260, the feedback signal from the server 130 is received by the microcontroller 120 remotely via the network.

In the operation 270, a feedback action is performed by the output device 150 connected to the microcontroller 120 according to the received feedback signal. For example, the output device 150 can be a vibrator placed on the left and right shoulders of the user. When the feedback signal about dodging to the left is received by the microcontroller 120, the vibrator on the left shoulder of the user vibrates, so that the vibrator on the left shoulder of the user vibrates in real time through the sense of touch and a warning is issued to the user of the notification device 100.

In some embodiments, the notification device 100 can be further connected to a console. The console can be used to manage one or more notification devices 100 or wearable devices with the notification devices 100 at the same time. For example, the console can actively send a feedback signal to a specific one of the notification devices 100 to directly drive the output device to perform a warning. Accordingly, the proactive notification provided in the above manner can further strengthen the warning function of the notification device 100. In some embodiments, the console can further configure one or more notification devices 100 into different groups, so as to notify a specific group or all notification devices 100 in different conditions in environment with loud-noise.

In this embodiment, the sound recognition module 135 and the classification module 140 can be trained through machine learning to provide customized recognition and classification of sound signals in response to different types of working environments. In details, please refer to following discussion.

Figure 6:
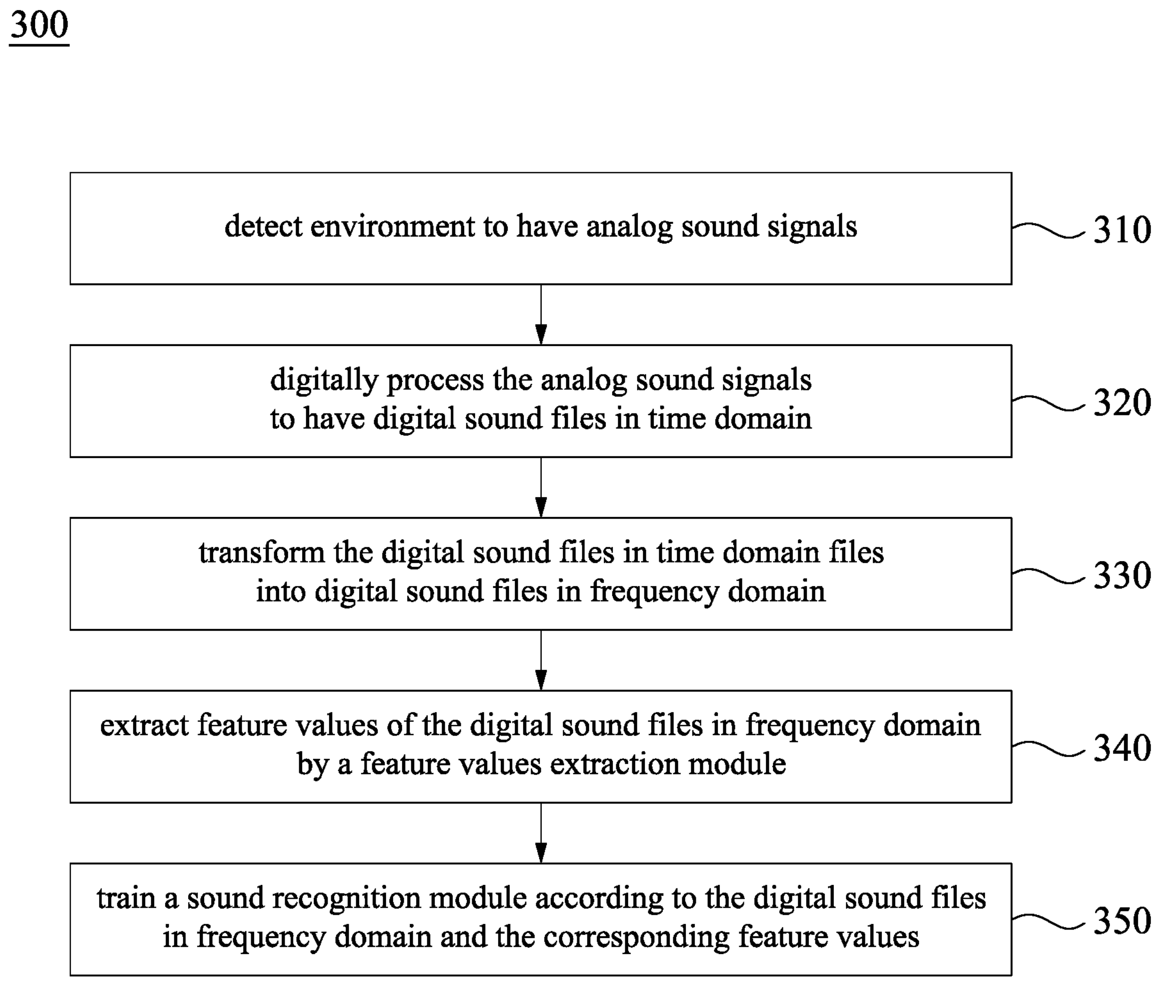
FIG. 6 illustrates a flowchart of a training method of training a sound recognition module according to an embodiment of the present disclosure.

Reference is made by FIG. 6. FIG. 6 illustrates a flowchart of a training method 300 of training a sound recognition module 135 according to an embodiment of the present disclosure.

As illustrated in figures, in operation 310, the sound sensor 110 is used to detect the environment to obtain analog sound signals. The user of the notification device 100 can select different detection environments according to actual needs.

In some embodiments, the sound sensor 110 can detect the signal according to the signal detection theory (SDT) by dynamically detecting the sound.

In operation 320, after the sound sensor 110 detects the analog sound signals in the environment, the analog sound signals are converts into digital sound files in time domain through digital processing. In some embodiments, the digital processing can be performed by the microcontroller 120. In some embodiments, the digital processing can also be performed remotely by the server 130. In some embodiments, the digital sound files in time domain can be further divided into several specific sound blocks according to time through frame blocking processing and the signals in individual sound blocks are processed and analyzed.

Continued with operation 320, in operation 330, the digital sound files in time domain is transformed into digital sound files in frequency domain. Specifically, the digital sound files in time domain can be transformed into digital sound fifes in frequency domain through the server 130 or other computer devices connected to the server 130 in a manner of fast Fourier transform (FFT). In some embodiments, by creating digital sound files in frequency domain, a spectrogram, which corresponds to the amplitudes of the digital sound files in time domain at different frequencies at different times, can be further obtained.

Continued with operation 330, in operation 340, characteristic values of the digital sound files in frequency domain are extracted through a sound characteristic value extraction module. The sound characteristic value extraction module is configured in the server 131. The characteristic values of the digital sound files in frequency domain correspond to different kinds of sounds. For example, the sounds from engineering equipment and human voice have different characteristics, and these characteristics response in the spectrum or spectrogram of the sound, for example. By analyzing the spectrum or spectrogram of the digital sound files in frequency domain, the characteristic values of the digital sound files in frequency domain can be extracted from the spectrum or spectrogram, so as to distinguish the difference between the sound produced by the engineering equipment and the human voice.

For example, the sound characteristic value extraction module can be performed by the use of Mel-Frequency Cepstral Coefficients (MFCCs) method. Through the calculation module of sound characteristic value extraction module, the digital sound files in frequency domain can be converted into the corresponding Mel-Frequency Cepstrum (MFC) to obtain the corresponding Mel-Frequency Cepstrum Coefficients (MFCCs). The Mel-Frequency cepstrum coefficients can be used as the characteristic value of the digital sound files in frequency domain, so that what kinds of the digital sound files in frequency domain can be obtained, the kinds of the digital sound files in frequency domain are, for example, the sound of engineering equipment or human voice. In some embodiments, Deep Neural Networks (DNN) technology in the field of artificial intelligence can be used in the sound characteristic value extraction module to extract the characteristic values of the digital sound files in frequency domain. Deep neural network technology has a good performance in image recognition. Therefore, conceptually, the digital sound files in frequency domain can be converted into an image, and the sound corresponding to the image of the digital sound files in frequency domain can be identified by image recognition to obtain the corresponding characteristic value.

Specifically, in one embodiment, the server 130 includes a convolutional neural network (CNN) model. In the deep neural network technology, the convolutional neural network module can effectively realize the function of image recognition. A sequence of spectrograms provided by other sounds can be pre-input to the convolutional neural network model, so that the training of image recognition of the convolutional neural network model can be performed and completed. One sequence of spectrograms may refer to the frequency amplitude distribution diagrams at different times arranged in a time sequence. For example, a plurality of sets of corresponding sequence of spectrograms can be provided as the basis for image recognition for the sound of working equipment or human voice. In some embodiments, the sound used to train the convolutional neural network model is sampled in the actual working environment, so as to create a customized recognition scheme according to the actual environment. Therefore, after the learning of image recognition for the convolutional neural network model is completed, the convolutional neural network model can receive input of another sequence of spectrograms. The convolutional neural network model obtains the similar sound of another sequence of spectrograms through image recognition and then outputs a corresponding characteristic value. According to requirements of the user of the notification device 100, analog sound signals in the environment can be detected, the analog sound signals can be converted into digital sound files in frequency domain, and then a training is performed based on the files of existing human voices or sound of tools and instruments by inputting the digital sound files in frequency domain.

Therefore, another implementation manner of operation 340 can be implemented as follows. First, convert the digital sound file in frequency domain into a sequence of spectrograms. The spectrogram shows changes in the amplitudes of different frequencies over time. Here, a sequence of frequency amplitude distribution diagrams of digital sound files in frequency domain at different times can be output. Then, a sequence of spectrograms of the digital sound file in frequency domain is input into the convolutional neural network model in the sound characteristic value extraction module, and the characteristic value of the digital sound file in frequency domain can be output by the convolutional neural network model.

In operation 350, the sound recognition module 135 can be trained according to the digital sound files in frequency domain and their characteristic value. The training of the sound recognition module 135 can be applied by deep neural networks in the field of artificial intelligence. Each of the characteristic value of the digital sound file in frequency domain corresponds to a kind of the human voice or sounds tools and instruments. When a characteristic value of a digital sound file in frequency domain indicates that it is a human voice, the message content corresponding to the digital sound file in frequency domain is further input to the sound recognition module 135 to train the sound recognition module 135. When the characteristic value of the digital sound file in frequency domain indicates that it is the sound of a tools and instruments, corresponding condition information can be provided. Therefore, when the trained sound recognition module 135 receives the sound signal, it can identify whether the sound signal is a human voice or the sound of a tool or an instrument. If the sound signal is a human voice, the content of the message to be conveyed can be determined. If the sound signal is sound of a tool or an instrument, a corresponding situational information can be provided. In some embodiments, the microcontroller 120 can be directly connected to a single-chip computer, and the edge calculation of sound recognition can be realized on the premise of being easy to carry. For example, the single-chip computer includes raspberry pi.

Figure 7:
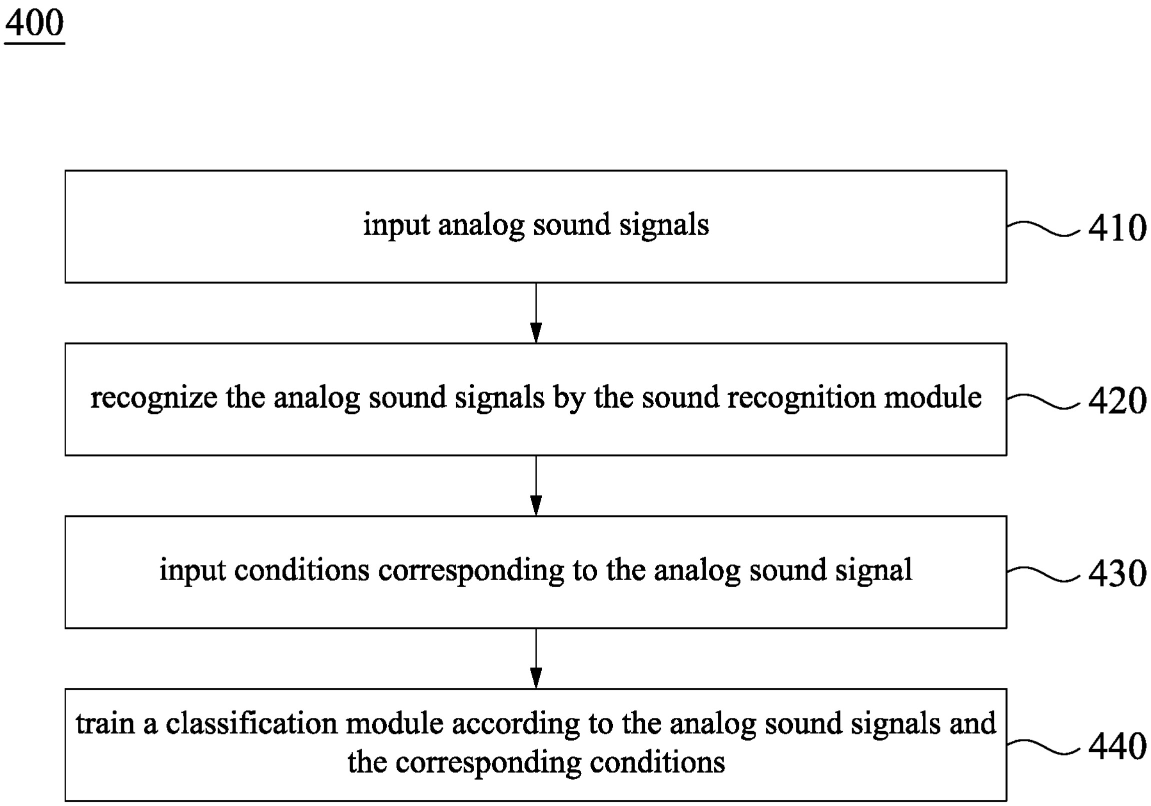
FIG. 7 illustrates a flowchart of a training method of training a classification module according to an embodiment of the present disclosure.

FIG. 7 illustrates a flowchart of a training method 1400 of training a classification module 140 according to an embodiment of the present disclosure. Similar to the voice recognition module 135, the classification module 140 can also achieve customized training through a deep neural network. The classification module 140 is used to distinguish the types of different analog sound signals to provide appropriate feedback signals.

In operation 410, analog sound signals are input. In operation 420, the input of the analog sound signals is recognized by, for example, the sound recognition module 135.

Then, in operation 430, the condition information corresponding to the analog sound signals are input. For example, when an analog sound signal is input, the analog sound signal can be recognized that is about message of dodging to the left from someone, and the corresponding condition is to dodge to the left at this time.

In operation 440, the classification module 140 can be trained according to the analog sound signals and their corresponding conditions. Specifically, the recognized analog sound signals are used as input, the corresponding specific conditions are used as the training target, and the classification module 140 can be trained to classify the recognized analog sound signal into different conditions. The different conditions are, for example, the condition of dodging to the left as mentioned above. Different conditions correspond to different types of the sound signals. Therefore, the notification device 100 is substantially integrated with a wireless network and can also personalize the setting of artificial intelligence identification parameters, so that the server 130 can receive different condition information for retraining. This is an implementation of the Internet of Thing (IoT) architecture of the overall service of the notification device 100 of the present disclosure. In addition, the microcontroller 120 can also implement a warning function beyond the Internet of Things architecture. For example, the microcontroller 120 integrated with the function of judging the volume of the sound signal can be used to detect abnormal changes in the environmental volume, so as to send another feedback signal for warning notification. The specific flow is similar to flowchart in FIG. 2, and the notification device 100 can perform the same function as the notification device 1. Therefore, in an environment where there is no network, the notification device 100 can also implement a warning notification function.

Figure 8:
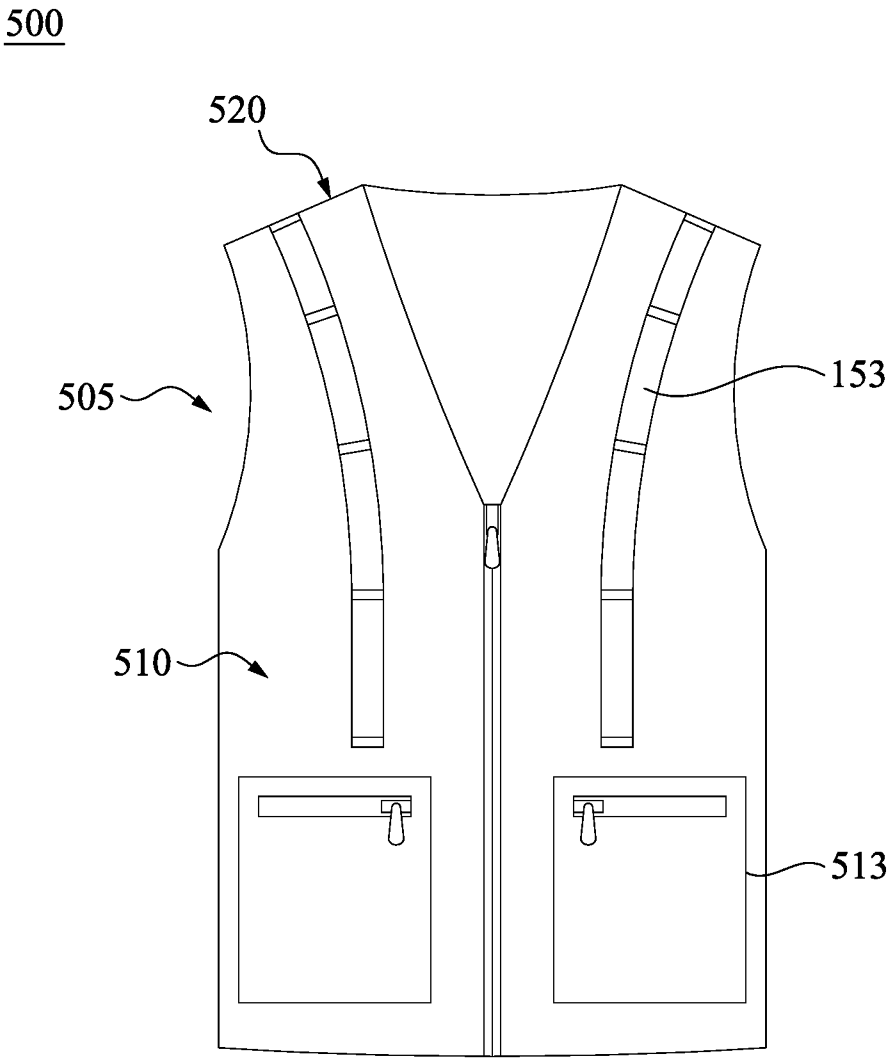
FIGS. 8-10 respectively illustrate a front view of a wearable device, a back view of the wearable device and a perspective view of the inside of the pocket of a wearable device according to an embodiment of the present disclosure.
Figure 9:
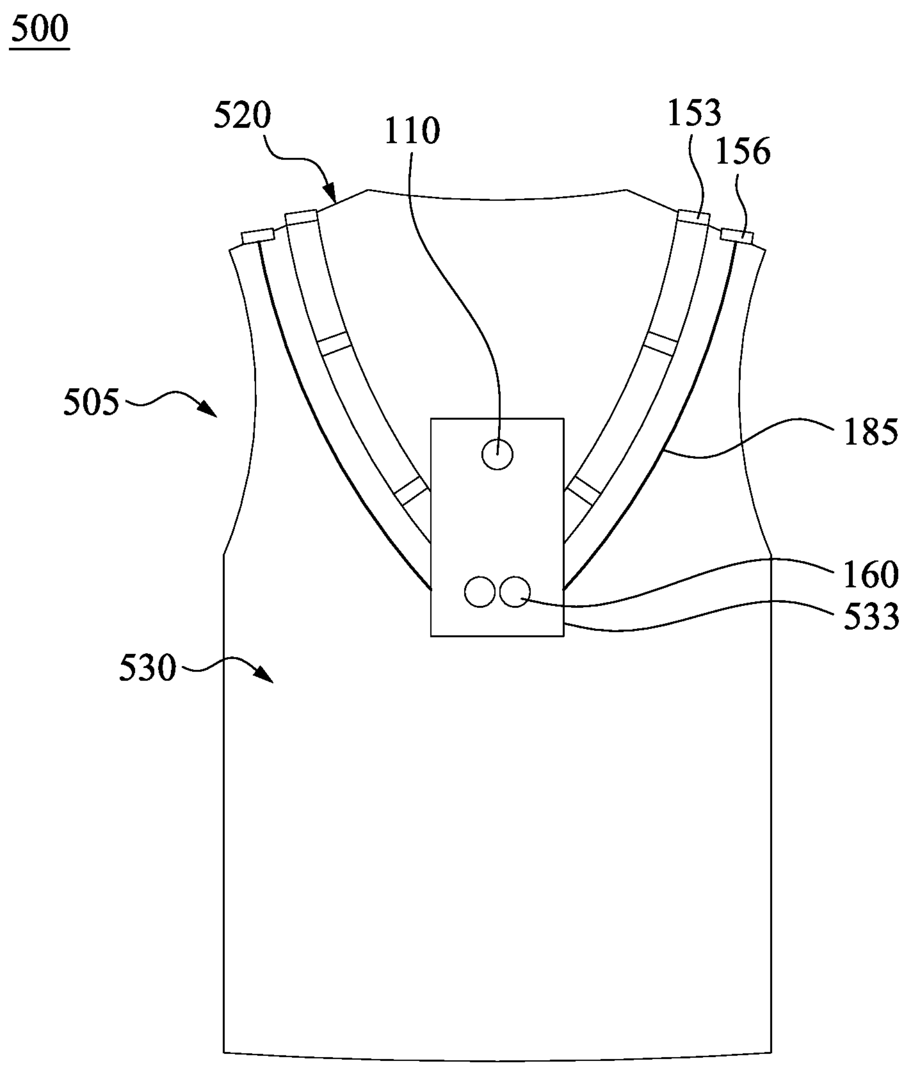
Figure 10:
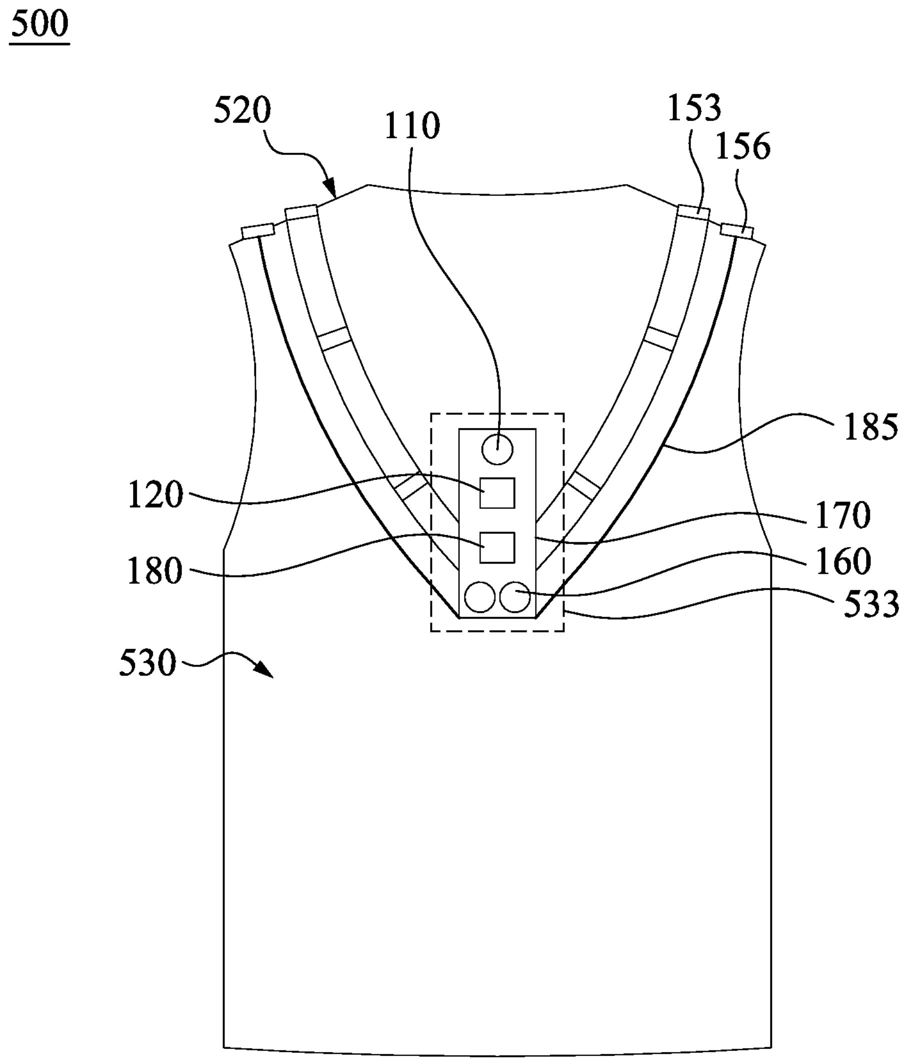

Reference is made by FIGS. 8, 9 and 10. FIGS. 8-10 respectively illustrate a front view of a smart vest 500, which is a wearable device, a back view of the wearable device and a perspective view of the inside of the pocket of the wearable device according to an embodiment of the present disclosure. In this embodiment, the notification device 100 is installed on a vest 505 to serve as a smart vest 500. In some embodiments, other cloth beyond the vest 505 can also be used.

Please refer to FIGS. 8 and 9. As shown in figures, the smart vest 500 includes a front 510, a back 530, and a shoulder 520 connecting the front 510 and the back 530. The front 510 is provided with a pocket 513 to accommodate the mobile phone and provide internet access. The back 530 of the smart vest 500 is also provided with a pocket 533. The pocket 533 is used to house and fix the components of the notification device 100, which includes the sound sensor 110, the distance sensor 160 and the circuit board 170.

As shown in FIG. 10, the sound sensor 110 of the notification device 100, the microcontroller 120, the power supply module 180 for supplying power, and the distance sensor 160 are integrated on the support plate 170. The power supply module 180 includes a battery and a switch. The wires can be integrated on the top, inside the interlayer, or on the opposite side of the circuit board 170.

In this embodiment, the sound sensor 110, the distance sensor 160 and the circuit board 170 are arranged in the pocket 533 on the back 530 of the smart vest 500. Since the eyes of the user are not easy to look at the back, the sound sensor 110 and the distance sensor 160 used for detecting environment are arranged on the back 530 of the smart vest 500, which can better play the role of the notification device 100 to detect danger and issue a warning. In some embodiments, the exposed parts of the sound sensor 110 and the distance sensor 160 are provided with a waterproof structure to adapt to different environmental changes. In this embodiment, the output device 150 provided on the smart vest 500 includes a light bar 153 and a vibrator 156. The vibrator 156 is connected to the circuit board 170 through a wire 185.

In summary, the present disclosure provides a notification device and a wearable device using the notification device. The notification device can detect the volume of the environment in a period of time, so as to notify the user in real time when the volume of the environment changes. The notification device can also connect to the server remotely by the microcontroller using the network. It is easy to carry and the server can recognize and classify the received sound signals to provide feedback based on the type of the sound signals. The type of the sound signal is, for example, human voice or sound of engineering equipment. The wearable device is, for example, a smart vest combined with a notification device, which is convenient to wear. By installing output devices such as a vibrator and a light bar on it, the user can easily perceive changes in the environment by means other than sound, which is conducive to real-time communication and warning. The notification device is also set to facilitate customized training to provide more accurate recognition and warning effects in different working environments.

Figure 11:
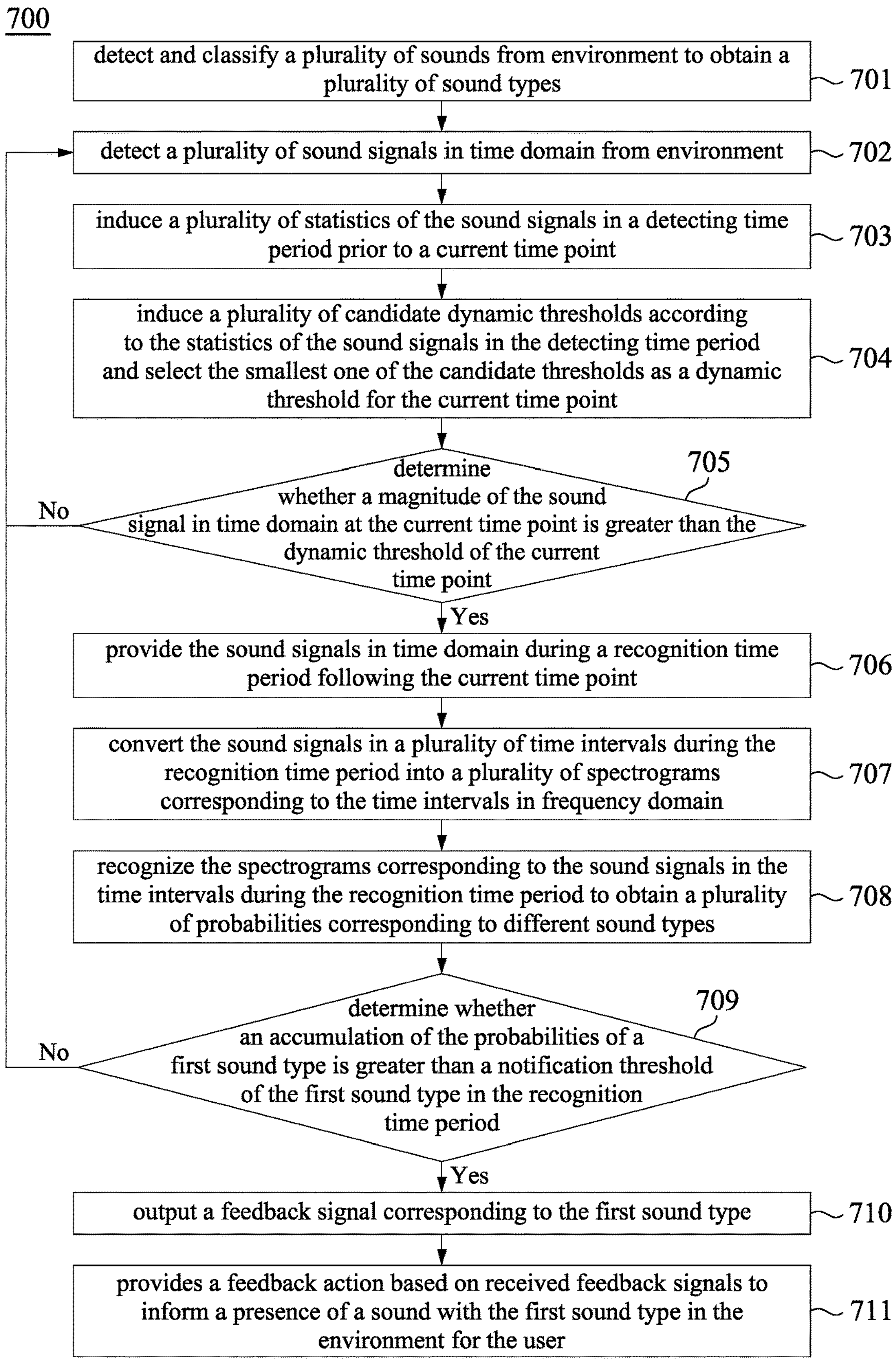
FIG. 11 illustrates a method 700 for notifying according to one or more embodiments of the present disclosure.
Figure 12:
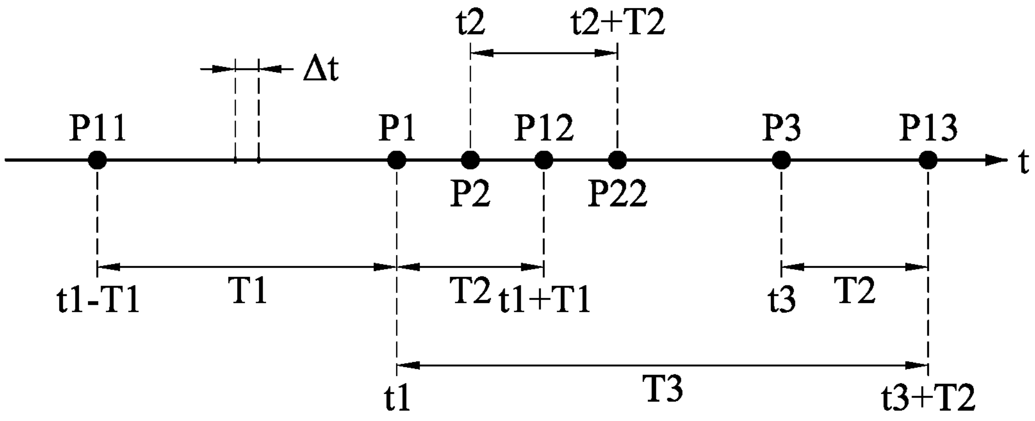
FIG. 12 illustrates a time line with one or more times in the method 700 for notifying according to one or more embodiments of the present disclosure.

Reference is made in FIGS. 11 and 12 to further illustrate one or more embodiments for notifications responding to different sound types of sound signals. FIG. 11 illustrates a notification method 700 according to one or more embodiments of the present disclosure. FIG. 12 illustrates a time line with one or more times in the method 700 for notifying according to one or more embodiments of the present disclosure.

In one or more embodiments, once a particular type of sound is present in the environment, it will be possible to perform a notification method 700 to efficiently detect and notify the user of the particular type of sound. In one or more embodiments of the present disclosure, the notification method 700 can be implemented by the notification device 1 or the notification device 100. For example, in one or more embodiments of the present disclosure, the notification device 100 may be an integrated mobile device, including, for example, a cellular phone. In one or more embodiments of the present disclosure, the notification device 100 may be carried by a user as part of a wearable device.

In operation 701, a plurality of sounds from environment is detected from environment, and the sounds are classified so as to obtain a plurality of sound types.

In one or more embodiments of the present disclosure, operation 701 can be performed by the notification device 1 or the notification device 100. For example, a plurality of analog sound signals from the environment can be detected by the sound sensor 10 of the notification device 1 or the sound sensor 110 of the notification device 100. The sounds contained in the analog sound signals from the environment can be obtained. For example, the sounds contained in the analog sound signals can be human voices from different humans or equipment sounds from different tools and instruments.

In some embodiments, the analog sound signals are then soundly recognized by the sound recognition module 135 of the notification device 100. The sound recognition module 135 can be provided by a method similar to the method 300.

In some embodiments, the sounds contained in the analog sound signals can be further classified by the classification module 140 of the notification device 100, and a plurality of sounds types of the sounds from the environments can be obtained. The sound types provided by the classification module 140 correspond to different conditions appearing in the environment. In some embodiment, the classification module 140 can be trained in the operation 701 through a method similar to the method 400.

It should be noted that a number of the sounds types of the sounds from the environment can be customized through the operation 701. That is, different numbers of the sound types can be selected for the different environment. For example, the environment in which the sounds are obtained from can be a closed factory environment or an open environment since the tools and instruments are different in the closed factory environment or the open environment, and a number of the sounds from the closed factory environment can be different from a number of the sounds from the open environment. Accordingly, in one or more embodiments of the present disclosure, the numbers of the sound types can be customized for different environment, and it would be helpful to the further recognition operations of method 700.

In operation 702, a plurality of sound signals in time domain is detected from the environment.

In one or more embodiments of the present disclosure, the sound signal from the environment can be continuously detected by the sound sensor 10 of the notification device 1 or the sound sensor 110 of the notification device 100 to obtain changes in the pressure variation of the sound signal at different times in the environment. It should be noted that the time-domain sound signals detected by the sound sensor 110 is the variation of the sound signal over the time domain, and the time-domain sound signals include volumes in decibels of the sound signals at different times.

In this embodiment, a current time is time point Pi, where the index i corresponds to a different time. As shown in FIG. 12, the time point P1 is the current time point. The sound sensor 110 can continuously detect the sound signals in time domain from another time point P11 prior to the current time point P1. The time point P12 follows the time point P1. The sound sensor 110 can continuously detect the sound signals in time domain between the current time point P1 and the time point P12. In FIG. 12, the current time point P1 is at time t1 second. The time point P11 is at time t1−T1 second and the time point P11 is earlier than current time point P1 by a time period T1. Time point P12 is at time t1+T2 second, and the time point P12 is later than the current time point P1 by a time interval T2. Time point P13 is at time t1+T3 second and the time point P13 is later than the current time point P1 by a time period T3.

In one or more embodiments of the present disclosure, when the sound signals in time domain are detected by the sound sensor 110, time period T1, time interval T2 or time period T3 can be further cut into a plurality of time intervals to detect the sound signals in time domain in the different time intervals. For example, as shown in FIG. 12, in this embodiment, a time of a frame can be defined as a time period Δt. Within the time period T1, the volume of the sound signal is detected from the environment for each frame as one of the detected sound signals in time domain. In some embodiments, for example but not limited to, the time period T1 can be set to 2 seconds and the time period Δt can be set to 0.0001 seconds (corresponding to 10,000 Hz), so as to slice the time period T1 into 10,000 frames, and then detect the different volume at these 10,000 frames as the sound signals in time domain.

For example, in some embodiments, after the sound sensor 110 detects the analog sound signals in time domain from the environment, the analog sound signals in time domain are converted into digital sound files in time domain by a digital processing. In some embodiments the digital processing can be performed by the microcontroller 120. In some implementations, the digital processing can also be performed remotely via the server 130. In some embodiments, the digital sound files in time domain can be further segmented into several specific sound blocks through an audio frame blocking processing, and the digital sound signals in time domain in each of the sound blocks can be processed and analyzed.

In one or more embodiments of the present disclosure, the time period T1 between the current time point P1 and the time point P11 can be considered as a detection period to confirm whether to perform sound recognition for the time period T3 following the current time point P1. For details, please refer to the subsequent description.

In operation 703, a plurality of statistics $S_{iy}$ of the sound signals in time domain during the detection period T1 prior to the current time point Pi are generated.

In this embodiment, the index i corresponds to different times (e.g., time point P1), and the index y corresponds to different types of statistics. For the current time point P1 (i=1), a plurality of statistics generated by the sound signals in time domain during the detection period T1 prior to the current time point P1 are presented as dynamic statistics $S_{1y}$.

In one or more embodiments of the present disclosure, operation 703 may be executed through the microcontroller 120 programmed in notification device 100. In one or more embodiments of the present disclosure, by contacting server 130 via microcontroller 120, operation 703 may be executed by one or more processors and memories in the server 130.

For example, in one or more embodiments of the present disclosure, the time period T1 can be divided into a plurality of sound blocks by the time period Δt, so that a plurality of sound signals in time domain are detected at different sound blocks in the time period T1 between the current time point P1 and time point P11. The sound signals in time domain are, for example, volumes. Therefore, the sound signals in time domain are statistically processed to obtain an average value $S_{11}$, a median value $S_{12}$, a mode value $S_{13}$, a maximum value $S_{14}$, a minimum value $S_{15}$, a standard deviation $S_{16}$ and an quartile deviation $S_{17}$ of the sound signals in time domain during the time period T1 between the current time point t P1 and the time point P11.

In operation 704, a plurality of candidate dynamic thresholds $CDT_{ix}$ is induced according to the statistics (e.g., the average value $S_{11}$, the median value $S_{12}$, the mode value $S_{13}$, the maximum value $S_{14}$, the minimum value $S_{15}$, the standard deviation $S_{16}$ and the quartile deviation $S_{17}$) of the sound signals in time domain during the detecting time period T1, and the smallest one of the candidate dynamic thresholds $CDT_{ix}$ as a dynamic threshold $DT_i$ for the current time point $P_i$.

In this embodiment, the index i of the candidate dynamic thresholds $CDT_{ix}$ corresponds to different time point Pi, and the index x corresponds to the different kinds of the candidate dynamic thresholds $CDT_{ix}$.

Specifically, in one or more embodiments of the present disclosure, after, the statistics $S_{1y}$ (e.g., the average value $S_{11}$, the median value $S_{12}$, the mode value $S_{13}$, the maximum value $S_{14}$, the minimum value $S_{15}$, the standard deviation $S_{16}$ and the quartile deviation $S_{17}$) for the sound signals in time domain during the time period T1 prior to the current time point P1 (corresponding to i=1) are provided, and a candidate dynamic threshold can be formed by the statistics $S_{1y}$ and expressed by the following relation (1):

$$CDT_{1x} = \sum_{y=1}^{7} W_{xy} S_{1y}$$

The statistics $S_{1y}$ are the average value $S_{11}$, the median value $S_{12}$, the mode value $S_{13}$, the maximum value $S_{14}$, the minimum value $S_{15}$, the standard deviation $S_{16}$ and the quartile deviation $S_{17}$. Coefficients $W_{xy}$ are weights, which have different values corresponding to different statistics $S_{1y}$. In some embodiment, $-\alpha<Wxy<\beta$, wherein $\alpha$, $\beta$ are positive integers. In one or more embodiments of the present disclosure, one or more statistics can be further considered.

According to the above relation (1), in one or more embodiments of the present disclosure, one or more candidate dynamic thresholds $CDT_{ix}$ can be provided for the time period T1 prior to the current time point P1. In one or more embodiments of the present disclosure, one or more sets of weights $W_{xy}$ are designed to induce one or more candidate dynamic thresholds $CDT_{ix}$ for different types of environments. For example, a factory and a road are two different environments. Different sets of the weights $W_{xy}$ can be used for different environments. Alternatively, unexpected deviations of the statistics $S_{iy}$ are caused by a plurality of conditions/situations in the same environment appears or intrinsic differences between the sound sensors 10/sound sensors 110 to be used, and the unexpected deviations of the statistics $S_{iy}$ can be reduced by the designed candidate dynamic thresholds $CDT_{ix}$.

In order to clearly illustrate how to create candidate dynamic thresholds $CDT_{ix}$ for the current time point P1 in operation 704, several examples of candidate dynamic thresholds are provided below.

In one or more embodiments of the present disclosure, the candidate dynamic threshold $CDT_{ix}$ may include the candidate dynamic threshold $CDT_{11}$, where in the relation (1) for calculating the candidate dynamic threshold $CDT_{11}$, the weight $W_{11}=1$ and the weights $W_{12}$, $W_{13}$, $W_{14}$, $W_{15}$, $W_{16}$ and $W_{17}$ are zero. In this case, the relation (1) for the calculation of the dynamic threshold $CDT_{11}$ can be expressed as $$CDT_{11} = \sum_{j=1}^{7} W_{1y} S_{1y} = W_{11} S_{11} = S_{11}$$

In other words, the candidate dynamic threshold $CDT_{11}$ is equal to the average value $S_{11}$ of the sound signals in time domain during the period T1 prior to time point P1. In this case, the candidate dynamic threshold $CDT_{11}$ is similar to the dynamic threshold of notification method 600, wherein dynamic threshold of notification method 600 is determined by a dynamic average value.

In one or more embodiments of the present disclosure, the candidate dynamic threshold $CDT_{ix}$ may include the candidate dynamic threshold $CDT_{12}$, wherein in the relational equation for calculating the candidate dynamic threshold $CDT_{12}$, the weight $W_{21}=1$, $W_{26}=-1$, and the weights $W_{22}$, $W_{23}$, $W_{24}$, $W_{25}$, and $W_{27}$ are all zero. In this case, the relation (1) for the calculation of the dynamic threshold $CDT_{12}$ can be expressed as $$CDT_{12} = \sum_{j=1}^{7} W_{2y} S_{1y} = W_{21} S_{11} + W_{26} S_{16} = S_{11} - S_{16}$$

In other words, the candidate dynamic threshold $CDT_{12}$ is equal to the average value $S_{11}$ minus the standard deviation $S_{16}$ of the sound signal in time domain during the period T1 prior time point P1.

Therefore, the candidate dynamic thresholds $CDT_{11}$ and $CDT_{12}$ are calculated. In the set of candidate dynamic thresholds $CDT_{11}$ and $CDT_{12}$, since the candidate dynamic threshold $CDT_{12}$ is less than the candidate dynamic threshold $CDT_{11}$, the candidate dynamic threshold $CDT_{12}$ is selected as the dynamic threshold $DT_1$ for the current time point P1.

Accordingly, the dynamic threshold $DT_i$ of the detected sound signals in time domain can be used to determine whether a user needs to be notified. In one or more embodiments of the present disclosure, operation 704 may also be performed by the microcontroller 120 programmed in the notification device 100. In one or more embodiments of the present disclosure, operation 704 may be communicated with the server 130 via microcontroller 120 to be executed via one or more processors and memory in server 130.

In operation 705, determine whether a magnitude of the sound signal in time domain at the current time point Pi is greater the dynamic threshold $DT_i$ of the current time point Pi.

In this embodiment, it is verified whether the volume received at the current time point P1 is greater than the dynamic threshold $DT_1$ obtained from the time period T1 prior to the current time point P1. If no, it returns to operation 702 and continues to detect the sound signals in time domain from the environment. If yes, proceed to operation 706, further sound recognition and notification operations are performed.

In one or more embodiments of the present disclosure, the dynamic threshold $DT_1$ reflects the volume prior to the current time point P1. In operation 705, if the magnitude of the sound signal in time domain at the current time point P1 is greater than the dynamic threshold, it means that a significant change in the sound signal in time domain at the current time point P1 relative to the sound signal in time domain during the period T1 prior the current time point P1 appears, so as to proceed to operation 706 to perform further identification operations.

It should be noted that the dynamic threshold $DT_1$ of the current time point P1 is determined by the statistics $S_{1y}$ of the sound signals in the time period T1 prior to the current time point P1. To obtain the dynamic threshold $DT_2$ for another time point P2, it must be determined by the statistics $S_{2y}$ of the sound signals in time domain during other time period T1 prior to time point P2. The statistics $S_{2y}$ include an average value $S_{21}$, a median value $S_{22}$, a plural value $S_{23}$, a maximum value $S_{24}$, a minimum value $S_{25}$, a standard deviation $S_{25}$, and an quartile deviation $S_{27}$ of the sound signals in time domain during the period T1 prior to the time point P2.

In other words, as the current time point Pi changes continuously over time, the time period T1 changes correspondingly and the statistics $S_{iy}$ of the sound signals during the time period T1 prior the current time point Pi also change dynamically. For example, the dynamical statistics $S_{iy}$ may include a dynamic mean value $S_{i1}$, a dynamic median value $S_{i2}$, a dynamic mode value $S_{i3}$, a dynamic maximum value $S_{i4}$, a dynamic minimum value $S_{i5}$, a dynamic standard deviation $S_{i6}$, and a dynamic quartile deviation $S_{i7}$ of the sound signals in time domain during the period T1 prior to the time point Pi. The dynamic threshold DTi, which is formed by the dynamic statistics $S_{iy}$, will also change over time.

In one or more embodiments of the present disclosure, operations 705 may also be executed through the microcontroller 120 programmed in notification device 100. In one or more embodiments of the present disclosure, operations 705 may be communicated with the t server 130 via the microcontroller 120 to be executed via one or more processors and memory in server 130.

In some embodiments, the total duration of operation of the notification device 1 or the notification device 100 after activation is less than duration of the time period T1. If the notification device 1 or notification device 100 performs the calculation of operation 705, it may cause the statistical data to be calculated out of order. In this case, a pre-designed value can be used to replace the dynamic threshold of failure, so that the notification device 1 or notification device 100 can still determine whether the identification operation needs to be performed later in the short operation time.

In operation 706, the sound signals in time domain during a recognition time period T3 following the current time point Pi (e.g., current time point P1) are provided. In some embodiments, as the current time point Pi changes over time, the time period T3 would also change relative to the current time point Pi.

On the time line as illustrated in FIG. 12, the time period T3 is between the time point P1 and the time point P13. The time point P13 is later than the time point P1 by the time period T3.

In one or more embodiments of the present disclosure, once the operation 706 is entered, the sound signals in time domain may be continuously provided to the server 130 via the microcontroller 120. For example, the sound signals in time domain during the time period T3 following the current time point P1 are transmitted to the server 130 by the microcontroller 120. The time period T3 can be considered as a recognition time period. Upon confirmation of a significant change in the sound signals in time domain at the current time point P1, the user is further notified via the server 130 of what type of sound the sound signals in time domain is in the time period T3 following the current time point P1.

In the view from operation 703 to operation 706, dynamic thresholds can be set to determine whether the sound signals in time domain during the time period T3 following the current time point P1 should be sent to the server 130.

For example, if the magnitude of the sound signals in time domain at the current time point P1 is less than the dynamic threshold, it reflects that no significantly change between the sound signals in time domain at the current time point P1 and the sound signals in time domain during the time period T1 prior to the current time point P1 is provided, and no alert is issued to notify the user.

In another example, if the magnitude of the sound signal in time domain at the current time point P1 is greater than the dynamic threshold, it reflects that a significantly change between the sound signals in time domain at the current time point P1 and the sound signals in time domain during the time period T1 prior to the current time point P1 appears, and a further recognition operation must be performed to notify the user.

Therefore, it will be able to efficiently save numbers of the sound signals that need to be transmitted and processed. If there is a change in the environment, the dynamic threshold is used to confirm whether the sound signals in time domain have changed enough to determine whether further recognition of the sound signals in time domain are required.

In operation 707, after the sound signals in time domain during the time period T3 following the current time point P1 are received by the server 130 the sound signals in a plurality of time intervals T2 in the recognition time period are converted into a plurality of spectrograms corresponding to the time intervals T2 in frequency domain. In this embodiment, each of the time intervals T2 has the same duration. As shown in FIG. 12, one or more time points (e.g., time point P1, time point P2, and time point P3) are provided in the time period T3 between time point P1 and time point P13. One of the time intervals T2 is extended from the time point P1 to the time point P13.

In this embodiment, each of the time intervals T2 has the same time duration. As shown in FIG. 12, the time period T3 between time point P1 and time point P13 includes a plurality of time points including the time point P1 at the boundary of time period T3, the time point P2, and time point P3. One of the time intervals T2 extends from time point P1 to time point P12.

According to FIG. 12, a time difference between time point P2 and time point P1 is less than one of the time interval T2. Therefore, another time interval T2 extending from time point P2 to time point P22 overlaps with time interval T2 extending from time point P1 to time point P12. In other words, in one or more embodiments of the present disclosure, the selected time intervals T2 in time period T3 are overlapping with each other.

In addition, as shown in FIG. 12, another time interval T2 extends from time point P3 to time point P13, which makes the time interval T2 extending from time point P3 extend just beyond the boundary of time period T3. Since other time periods T2 starting later than time point P3 will be beyond the boundary of time period T3, time interval T2 extending from time point P3 is the last time interval processed by operation 707.

It should be noted the time line shown in FIG. 12 is for illustrative purposes only and should not be used to unduly limit this disclosure.

For the purpose of simple description, in one or more embodiments of the present disclosure, it is possible to set the time interval T2 to be 2 seconds, the time period T3 to be 4 seconds, and a plurality of time points starting at each time period T2 to be spaced 0.1 seconds apart. In this case, based on time point P1 at time t1 second, the operation 707 will be able to convert multiple sound signals in time domain into spectrums or spectrograms for the following time intervals: time interval from time t1 second to time t1+2 second, time interval from time t1+0.1 second to time t1+2.1 second, time interval from time t1+0.2 second to time t1+2.2 second, . . . , and time interval from time t1+2 second to time t1+4 second for a total of 20 time intervals. In operation 707, the sound signals in time domain during the 20 time intervals are converted into spectrums or spectrograms. The spectrums or spectrograms are the sound information corresponding to time interval T2 in frequency domain, and the spectrums or spectrograms reflect the intensity of sound signals at different frequencies during time interval T2. The used of the plurality of the time intervals T2 during the time period T3 is able to response a continuous appearance of a sound of one of the sound types.

In one or more embodiments of the present disclosure, the microcontroller 120 can provide time-domain digital sound files of the sound signals in time domain during the time periods T2 following the current time point P1 to the server 130 or other computer devices connected to the server 130, so that a fast Fourier transform (FFT) operation is performed to convert the time-domain digital sound files to digital sound files in frequency domain. The FFT is used to convert the time-domain digital sound files to the digital sound files in frequency domain. Therefore, a plurality of spectrums or spectrograms corresponding to multiple time intervals T2 in the time period T3 following the current time point P1 can be obtained. The spectrums or spectrograms are the sound information corresponding to time intervals T2 in frequency domain. In some embodiments, the FFT for the sound signals in time domain can be performed by the processor 145 of the server 130.

In operation 708, recognize the spectrums or spectrograms corresponding to the time intervals T2 in the recognition time period T3 to obtain a plurality of probabilities corresponding to different sound types.

In some embodiments, the operation 708 may be performed by the sound recognition module 135 trained in the server 130. In some embodiments, the sound recognition module 135 can be trained by the method 300. The trained sound recognition module 135 in the server 130 performs image recognition of the sound spectrum map (i.e., sound information in frequency domain) generated by the operation 707 and outputs the probabilities correspond to the sound spectrums or spectrograms map.

In details, a plurality of sound types includes engineering instrument sounds, human voices or other sound types. For a specific current time point Pi, the probabilities of N of sound types in the time interval T2 following the time point Pi respective have the probabilities $Prob_{i1}$, $Prob_{i2}$, . . . , $Probi_N$, and the sum of these probabilities can be expressed by the following relation (2)

$$\sum_{j=1}^{N} Prob_{ij} = 1$$

The indexes i in the above relation (2) corresponds to different time points Pi. The indexes j in the above relation (2) corresponds to different sound types (e.g. human voice of engineering equipment sound). N is the number of the sound types for the environment. In this embodiment, the number N is determined by the operation 701, and probabilities of sound not appearing in the environment would be reduced to zero. The relation (2) can be regarded as a normalization relation to inhibit that the sound would not appear in the environment.

In other words, each of the probabilities $Prob_{i1}$, $Prob_{i2}$, . . . . $Prob_{iN}$ is in a range between zero and one, and the sum of the probability assignment values $Prob_{i1}$, $Prob_{i2}$, . . . . $Prob_{iN}$ sum to one.

For example, the sound recognition module 135 recognizes the sound spectrum of the time interval T2 following the time point P1 (i=1) in the time period T3, and the first sound type (e.g., human voice) has the probability $Prob_{11}$, the second sound type (e.g., engineering equipment sound) has the probability $Prob_{12}$, and so on. The sound recognition module 135 can recognize N types of sound types. In this way, the probabilities output by the sound recognition module 135 include probabilities $Prob_{11}$, $Prob_{12}$, . . . , $Prob_{iN}$, and the probabilities $Prob_{11}$, $Prob_{12}$, . . . , $Prob_{iN}$ are designed to satisfy the following relation (2)

$$\sum_{j=1}^{N} Prob_{1j} = 1$$

In another embodiment, the sound recognition module 135 recognizes the sound spectrogram of the time interval T2 following another time point P2 (i=2) in the time period T3, and the first sound type (e.g., human voice) has the probability $Prob_{21}$, the second sound type (e.g., engineering equipment sound) has the probability $Prob_{22}$, and so on. The sound recognition module 135 can recognize N types of sound types. n this way, the probabilities outputted by the sound recognition module 135 include probabilities $Prob_{21}$, $Prob_{22}$, . . . , $Prob_{2N}$, and the probabilities $Prob_{21}$, $Prob_{22}$, . . . , $Prob_{2N}$ are designed to satisfy the following relation (2)

$$\sum_{j=1}^{N} Prob_{2j} = 1$$

Therefore, in operation 708, sound recognition is performed for different time intervals starting from different time points P1, P2, and P3 in time period T3, and multiple probabilities corresponding to multiple different sound types in different time intervals are obtained.

In operation 709, determine whether an accumulation of the probabilities of a first sound type is greater than a notification threshold of the first sound type in the recognition time period T3. If no, there is no need to notify for the first sound type and go back to operation 702. If yes, go to the subsequent operations 710 and 711.

Specifically, in order to avoid misclassification, the consistency of the sound recognition results in the time intervals starting from multiple different time points can be considered in operation 709. For example, for a first sound type of the sound types determined by operation 701, the notification threshold $NT_1$ for the first sound type can be designed, and it is verified that the probabilities $Prob_{11}$, $Prob_{21}$, . . . for multiple first sound types derived in time period T3 are higher than the designed notification threshold for the first sound type. The accumulation of the probabilities of multiple first sound types can be expressed by the following relation (3)

$$\sum_{i=1}^{Q} Prob_{i1} \geq NT_1$$

The index I corresponds to different time points in time period T3, and a number of the different time points in time period T3 is Q.

Similarly, for a second sound type (j=2) of the sounds types, it can be confirmed whether an accumulation of probabilities of the second types is greater than a designed notification threshold for the second sound type. That is, the accumulation of the probabilities of multiple first sound types can be expressed by the following relation (3)

$$\sum_{i=1}^{Q} Prob_{i2} \geq NT_2$$

In some embodiment, for example but not limited to, the notification threshold $NT_1$ for the first sound type is, for example, 1. In this way, once the probability of the first sound type in one of the time interval T2 in the time period T3 is 100%, i.e., one of the probabilities $Prob_{11}$, $Prob_{21}$, . . . , $Prob_{Q1}$ is equal to 1, operation 709 determines that the cumulative probability of the first sound type during the recognition time period T3 is greater than the notification threshold $NT_1$ of the first sound type, so that following operation 710 is proceeded.

In some embodiments, for example but not limited to, the notification threshold $NT_1$ for the first sound type can be a number greater than 1. In some embodiment, the notification threshold $NT_1$ for the first sound type can be 6. Since each of the probabilities $Prob_{11}$, $Prob_{21}$, . . . , $Prob_{Q1}$ is a number in a range between zero and one, the accumulation of the probabilities $Prob_{11}$, $Prob_{21}$, . . . , $Prob_{Q1}$ is greater than 6 if multiple ones of the probabilities $Prob_{11}$, $Prob_{21}$, . . . , $Prob_{Q1}$ is non-zero. That is, the sound of the first sound type appears continuously in the recognition time period T3, a further notification operation must be performed, and following operation 710 is proceeded.

In one or more embodiments of the present disclosure, different notification thresholds $NT_j$ can be set for different sound types. For example, in some embodiments, if the first sound type of the different sound types is human voice and the second sound type of the different sound types is engineering instrument sound, the notification threshold $NT_1$ of the first sound type of human voice can be set to be less than the notification threshold $NT_2$ of the second sound type of engineering instrument sound such that it is more sensitive to a recognition of human voice.

In one or more embodiments, since a sum of the probabilities of different sound types in one of the time intervals during the recognition time period T3 is normalized, the notification thresholds $NT_j$ (e.g. the notification threshold $NT_1$ for the first sound type and the notification threshold $NT_2$ for the second sound type) can be designed so that only one of the accumulations of the probabilities for the different sound type during the recognition time period T3 has a value greater than the corresponding notification thresholds $NT_j$.

In one or more embodiments of the present disclosure, for the same sound type in different environments, different notification thresholds can be designed. For example, in a closed factory environment, the human voice can be easily ignored. In some embodiments, the notification threshold of the first sound type in the closed factory environment is less than the notification threshold of the first sound type in an open environment, so that it is more sensitive to identify the human voice in the closed factory environment.

In some embodiments, the operation 709 can be performed by an integration of the sound recognition module 135 and the classification module 140 of the notification device 100. The classification module 140 is configured to limit the number N of sound types in which the sound recognition module 135 recognizes. Therefore, the computing cost for the sound recognition module 135 can be reduced.

Following operation 709, in operation 710, a feedback signal corresponding to the first sound type is outputted. In some embodiments, the microcontroller 120 receives feedback signals from the server 130 remotely over a network. For example, in some embodiments, the feedback signal corresponding to the first sound type can be provided by the classification module 140 of the server 130, and the feedback signal corresponds to one of the condition in the environment. In some embodiments, the classification module 140 can be trained by the method 400.

In operation 711, a feedback action is provided based on received feedback signals to inform a presence of a sound with the first sound type in the environment for the user. In some embodiments, the output device 150 connected to the microcontroller 120 makes a feedback action based on the received feedback signal. For example, the output device 150 can be a vibrator set on the user to alert the user of the notification device 100 in real time by tactile.

In summary, the notification method 700 enables the recognition and notification of the sound signals in different environments in an adaptive manner. Number of sound types can be limited and customized for different environments. Dynamic threshold used to perform a recognition operation at a current time point can be determined based on the dynamic statistics during a time period prior to the current time point. An efficient recognition operation can be performed according to the sound signals filtered by the dynamic threshold and the limited sound types of the environment.

Although the present invention has been described in considerable detail with reference to certain embodiments thereof, other embodiments are possible. Therefore, the spirit and scope of the appended claims should not be limited to the description of the embodiments contained herein. In view of the foregoing, it is intended that the present invention cover modifications and variations of this invention provided they fall within the scope of the following claims.

What is claimed is:

1. A notification device, comprising:

a sound sensor configured to detect a plurality of sound signals in time domain from an environment;

a microcontroller connected to the sound sensor to receive the sound signals in time domain, wherein the microcontroller is configured to:

generate a plurality of dynamic statistics of the sound signals in time domain during a first time period prior to a current time point;

generate a dynamic threshold corresponding the current time point by composing the dynamic statistics, comprising:

generating a plurality of candidate dynamic thresholds, wherein each of the candidate dynamic thresholds is formed by the dynamic statistics and a plurality of weights corresponding to the dynamic statistics; and selecting the smallest one of the candidate dynamic thresholds as the dynamic threshold;

provide the sound signals in time domain during a second time period following the current time point when a magnitude of the sound signal in time domain at the current time point is greater than the dynamic threshold, and transmit a feedback signal corresponding to the sound signals in time domain during the second time period following the current time point; and an output device connected to the microcontroller, wherein the output device is configured to provide a feedback action according to the feedback signal.

2. The notification device of claim 1, further comprising:

a server connected to the microcontroller through a network, wherein the server is configured to receive the sound signals in time domain during the second time period following the current time point, and the server is configured to transmit the feedback signal to the microcontroller according to a first sound type of the sound signals in time domain during the second time period.

3. The notification device of claim 2, wherein the server further comprises:

a processor configured to convert the sound signals in time domain during the second time period into a plurality of spectrograms; and a sound recognition module configured to recognize the spectrograms to obtain a plurality of probabilities of a plurality of sound types of the sound signals in time domain during the second time period, wherein the sound types comprises the first sound type.

4. The notification device of claim 1, wherein the dynamic statistics comprises an average value, a median value, a mode value, a maximum value, a minimum value, a standard deviation and a quartile deviation of the sound signals in time domain during the first time period.

5. The notification device of claim 1, wherein the output device comprises a light emitting device, a vibrator, a sound amplifier or a text icon display device.

6. A wearable device, comprising:

the notification device of claim 1; and a cloth, wherein the sound sensor, the microcontroller and the output device of the notification device are arranged on the cloth.

7. A notification method, comprising:

detecting a plurality of sound signals in time domain from environment;

processing the sound signals in time domain during a first time period prior to a current time point to obtain a plurality of dynamic statistics of the sound signals in time domain during the first time period;

generating a dynamic threshold corresponding to the current time point by the dynamic statistics, comprising:

generating a plurality of candidate dynamic thresholds, wherein each of the candidate dynamic thresholds is formed by the dynamic statistics and a plurality of weights corresponding to the dynamic statistics; and selecting the smallest one of the candidate dynamic thresholds as the dynamic threshold;

confirming whether a magnitude of the sound signals in time domain at the current time point is greater than the dynamic threshold;

converting the sound signals in time domain during a second time period following the current time point to a plurality of sound information in frequency domain when the magnitude of the sound signals in time domain at the current time point is greater than the dynamic threshold;

recognizing the sound information in frequency domain to obtain a first sound type corresponding to the sound information; and transmitting a feedback signal to an output device based on the first sound type.

8. The notification method of claim 7, wherein the dynamic statistics comprises an average value, a median value, a mode value, a maximum value, a minimum value, a standard deviation and a quartile deviation of the sound signals in time domain during the first time period.

9. The notification method of claim 7, wherein the current time point changes over time, so that the first time period and the second time period change relative to the current time point.

10. The notification method of claim 7, wherein the sound information in frequency domain are a plurality of spectrograms.

11. The notification method of claim 7, wherein recognizing the sound information in frequency domain further comprises:

generating a plurality of time intervals all within the second time period; and converting the sound signals in time domain during the time intervals into the sound information in frequency domain.

12. The notification method of claim 11, wherein one or more of the time intervals are overlapped from each other.

13. The notification method of claim 11, wherein the sound information in frequency domain are a plurality of spectrograms, recognizing the sound information in frequency domain further comprises:

recognizing the spectrograms to obtain a plurality of probabilities corresponding to a plurality of sound types for each of the spectrograms, wherein the sound types comprise the first sound type.

14. The notification method of claim 13, wherein recognizing the sound information in frequency domain further comprises:

setting a notification threshold corresponding to the first sound type; and providing the feedback signal corresponding to the first sound type when an accumulation of the probabilities for the first sound type during that second time period is greater than that notification threshold.

15. A notification method, comprising:

detecting sounds from environment and providing a plurality of conditions corresponding to the sounds from the environment to establish a sound recognition module in a server;

detecting a plurality of sound signals in time domain from environment;

processing the sound signals in time domain during a first time period prior to a current time point to obtain a plurality of dynamic statistics of the sound signals in time domain during the first time period;

generating a dynamic threshold corresponding to the current time point by the dynamic statistics, comprising:

generating a plurality of candidate dynamic thresholds, wherein each of the candidate dynamic thresholds is formed by the dynamic statistics and a plurality of weights corresponding to the dynamic statistics; and selecting the smallest one of the candidate dynamic thresholds as the dynamic threshold;

confirming whether a magnitude of the sound signals in time domain at the current time point is greater than the dynamic threshold;

transmitting the sound signals in time domain during a second time period following the current time point to the server;

recognizing the sound signals in time domain during the second time period to obtain a first sound type of the sound signals in time domain during the second time period, wherein the first sound type corresponds to one of the condition;

providing a feedback signal corresponding to the first sound type; and providing a feedback action by an output device according to the feedback signal to notify an user wearing the output device.

16. The notification method of claim 15, wherein the dynamic statistics comprises an average value, a median value, a mode value, a maximum value, a minimum value, a standard deviation and a quartile deviation of the sound signals in time domain during the first time period.

17. The notification method of claim 15, wherein the current time point changes over time, so that the first time period and the second time period change relative to the current time point.

18. The notification method of claim 15, wherein recognizing the sound signals in time domain further comprises:

generating a plurality of time intervals all within the second time period;
converting the sound signals in time domain during the time intervals into a plurality of sound information in frequency domain, wherein the sound information are a plurality of spectrograms;
recognizing the spectrograms to obtain a plurality of probabilities corresponding to a plurality of sound types for each of the spectrograms, wherein the sound types comprise the first sound type;
setting a notification threshold corresponding to the first sound type; and
providing the feedback signal corresponding to the first sound type when an accumulation of the probabilities for the first sound type during that second time period is greater than that notification threshold.

* * * * *